US006718607B1

(12) United States Patent
Gillet et al.

(10) Patent No.: US 6,718,607 B1
(45) Date of Patent: Apr. 13, 2004

(54) EQUIPMENT FOR FIXING AN ELASTIC CLAMP BAND

(75) Inventors: Pascal Gillet, Sarcey (FR); Fabrice Petit, Orcevaux (FR); Laurent Melin, Nogent (FR)

(73) Assignee: Gillet Outillage, Nogent (FR)

( * ) Notice: Subject to any disclaimer, the term of this patent is extended or adjusted under 35 U.S.C. 154(b) by 0 days.

(21) Appl. No.: 09/936,263

(22) PCT Filed: Mar. 8, 2000

(86) PCT No.: PCT/FR00/00571

§ 371 (c)(1), (2), (4) Date: Sep. 10, 2001

(87) PCT Pub. No.: WO00/53374

PCT Pub. Date: Sep. 14, 2000

(30) Foreign Application Priority Data

| | | |
|---|---|---|
| Mar. 8, 1999 | (FR) | 99 03273 |
| Sep. 8, 1999 | (FR) | 99 11232 |
| Jan. 11, 2000 | (FR) | 00 00915 |

(51) Int. Cl.[7] .......................... B23P 19/04; B23P 21/00; B23P 11/02; B23Q 7/10; B25B 27/10

(52) U.S. Cl. ............................. 29/229; 29/809; 29/268; 29/771; 29/451; 81/9.3

(58) Field of Search .......................... 29/229, 809, 451, 29/450, 453, 243.56, 268, 771, 222; 81/9.3, 426.5

(56) References Cited

U.S. PATENT DOCUMENTS

| | | | | |
|---|---|---|---|---|
| 2,641,148 A | | 6/1953 | Arthur | |
| 3,623,635 A | | 11/1971 | Erdmann | |
| 5,125,296 A | * | 6/1992 | Nelson et al. | 81/9.3 |
| 5,209,143 A | * | 5/1993 | Sweet | 81/9.3 |
| 5,259,109 A | * | 11/1993 | Fefeu et al. | 29/771 |
| 5,315,746 A | | 5/1994 | Machino et al. | |

FOREIGN PATENT DOCUMENTS

| | | |
|---|---|---|
| DE | 1 185 129 | 1/1965 |
| DE | G 92 16 463.3 | 1/1993 |
| DE | 44 40 210 A1 | 5/1996 |

* cited by examiner

*Primary Examiner*—John C. Hong
(74) *Attorney, Agent, or Firm*—Young & Thompson

(57) ABSTRACT

A method and an implementation equipment for fixing an elastic clamp band (1) to the lugs (5) particularly adapted for re-current mounting of a flexible connection pipe (12) on a pipe system (13). An automatic dispenser (2) of clamp bands (1) is arranged to position each clamp band (1) such that its two lugs are externally accessible to be seized by the grips (9, 52, 103) of a hand tool for extracting and fixing (8, 50, 100) which are brought together to compress the lugs (5) of the clamp band (1) by external (11) separately controlled actuators. The tool (8, 50, 100) comprises elements for bringing together the grips (9, 52, 103)) freely and reversibly when the external actuators (11) are activated and elements for releasing them instantly or gradually at the desired moment with an external control (14, 123).

35 Claims, 13 Drawing Sheets fig.1
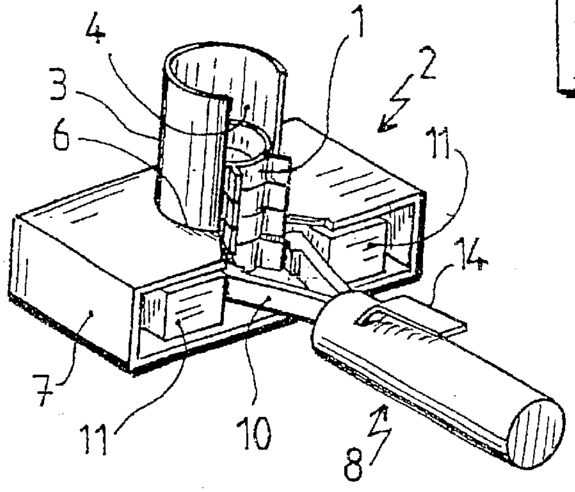
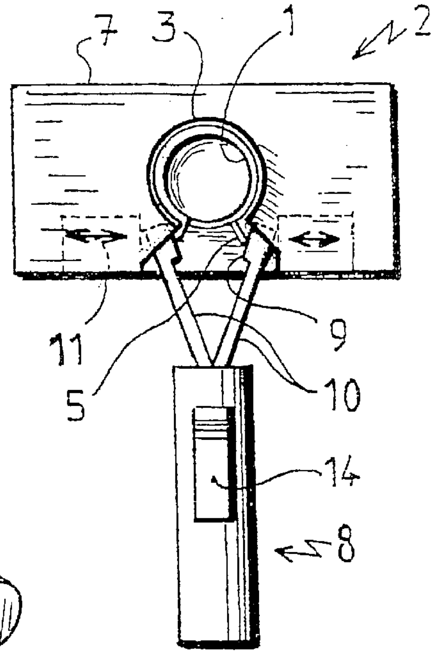
fig.2
fig.3
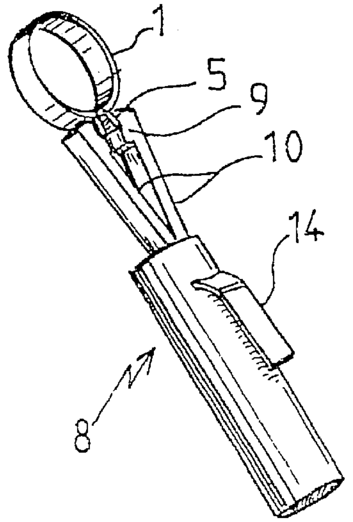
fig.4
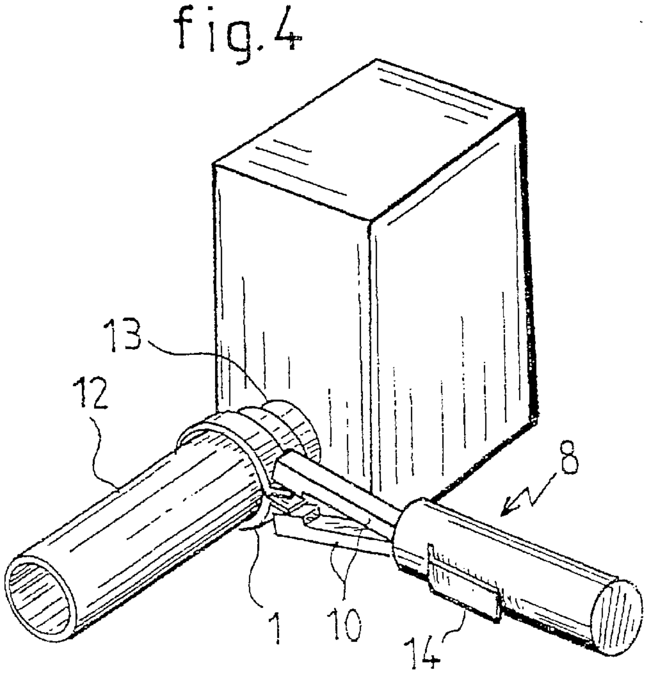

fig.9
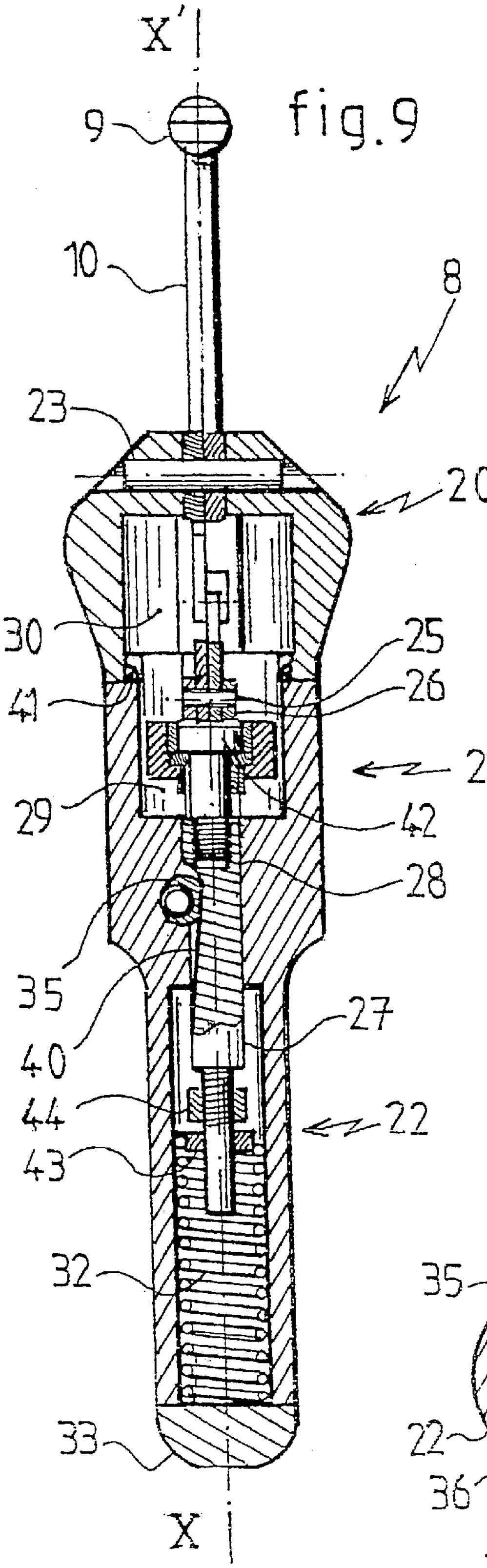
fig.10
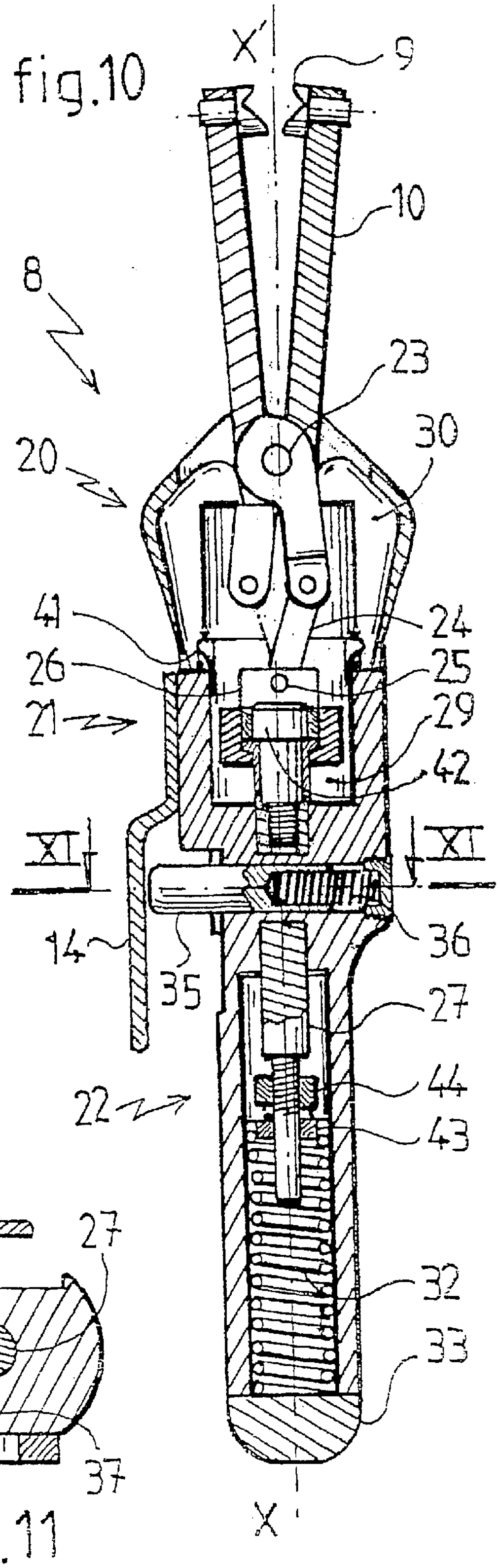
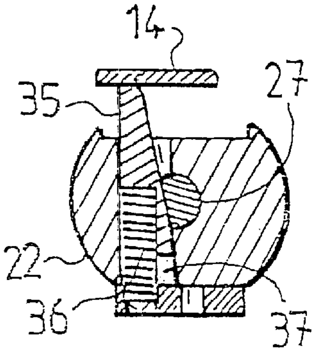
fig.11

EQUIPMENT FOR FIXING AN ELASTIC CLAMP BAND

BACKGROUND OF THE INVENTION

The invention relates to a process for applying resilient clamping bands with lugs, particularly adapted to assembly lines for products such as flexible pipes particularly in the automotive field; the invention also relates to the tools for practicing the process.

The invention relates to clamping bands which are conventionally produced from a strip of sheet metal shaped as a generally circular ring. The ring in question is adapted to be deformed by spacing its two ends which creates a resilient return couple used for gripping; among these types of clamping bands are of particular interest those whose two ends of the spring band overlap; an intermediate cutout of the clamping band extends for several centimeters at one of its ends to form a passage for the other, which is decreased in width to coincide with said passage. The two ends of the band are provided with a drive lug obtained by simple right angle bending of its external portions outwardly of the band such that, thanks to a plier having jaws, the two control lugs can easily be brought together, which is to say to increase the diameter of the clamping band which produces, when released, the resilient return couple necessary for gripping, for example of a flexible pipe on a pipe system.

DESCRIPTION OF THE RELATED ART

There exist numerous tools for mounting and unmounting such clamping bands, but they are very generally manually operated and independent; these tools must be of small size and particularly light in weight to fulfill effectively the speed required for present production lines.

Other problems also arise for these tools, which require the user to exert, for each mounted resilient clamping band, the force necessary at least for their expansion, even if they use lever systems greatly facilitating this operation, as is for example taught by French patent FR-96/16083.

SUMMARY OF THE INVENTION

It will accordingly be evident that it would be advantageous to have a mechanized device permitting instead to permit the user to pre-stress the resilient clamping bands before emplacement, without at the same time losing the advantage of small size of a strictly manual and independent application tool permitting rapid and precise positioning in an environment with very limited accessibility.

To this end, and according to the present invention, there is proposed for applying resilient clamping bands with lugs, particularly adapted to repeated mounting of flexible pipes on a pipe system, a process that it remarkable in that from a clamping band dispenser associated with a hand tool that is autonomous, forming the assembly of the tool for applying resilient bands, said tool being conventionally provided with two jaws shaped for gripping and bringing together the lugs of a clamping band to open it, the following successive steps being taken:

a) emplacing the jaws of the tool on the lugs of a first clamping band suitably positioned in the dispenser, b) pre-locking the jaws of the tool bearing on the ears of said clamping band bringing it into the opening position thanks to mechanized actuation means, c) self-holding the jaws in the pre-locking position thanks to internal means of the tool, d) withdrawing from the dispenser said first clamping band held open by the hand tool and the correct automatic positioning of a second clamping band ready for a second extraction, e) positioning the opened clamping band about the flexible pipe, f) releasing the locking of the jaws of the tool which is provided for this purpose with control means to close the clamping band on the flexible pipe, and to cause its clamping on the pipe system, and releasing the tool for a new operation.

It will be easily understood that it is very interesting to have such a process that does not require the user to exert the energy necessary to pre-stress the resilient clamping bands before positioning on the piping, which instead is performed by an external device which can be automatically or manually controlled by the operator himself.

According to a preferred characteristic, the operation of pre-stressing the clamping bands taking place within the dispenser, the dangers of untimely ejection and breakage are eliminated, that are now observed with conventional hand tools at the time of insertion of the clamping bands between their jaws.

According to another object of the invention, there is provided a hand tool for extraction and positioning that is particularly adapted for use in the process described above. According to a first modification, such a tool comprises two confronting jaws, shaped to receive the lugs of a resilient clamping band and disposed at the end of two articulated legs to be disposed in a V shape so as to coact with the clamping band dispenser in a fixed position provided with its pre-compression system as has been mentioned; in this modification, the positioning tool is provided with a blocking system permitting freely and automatically the operation of the mechanism for bringing the jaws together to stress a clamping band and, on the contrary, preventing the reverse movement except when actuated by a control provided for this purpose to space apart automatically the movable jaws. According to this first modification, the release device for the jaws which will be described in greater detail hereafter, has no progressivity such that the positioning of the clamping band is extremely quick, which can lead in certain situations to a loss of precision in its positioning on the clamping zone. This is the reason why there are also provided two other modifications of the positioning tool that can use the process according to the invention, which permit a more progressive release of the jaws at the time of mounting the clamping band on the flexible pipes.

Thus, according to other modifications of the positioning tool, the latter comprises two legs provided, at one of their ends, with jaws and an articulation at the other to open freely under the action of the stress in the clamping band from a position in which they are close to each other or the jaws hold the compression of the clamping band, to a deployed position in a V configuration permitting the jaws to engage or disengage the lugs of the clamping band when the latter is respectively ready in the fixed dispenser, or discharge after its emplacement on the flexible pipe, coacting with means such that, when said legs are mounted slidably along their articulated ends in the direction of their longitudinal axis within and into abutment with a bottom of a casing, only the jaws emerge from the opening of said casing with which the legs coact to be held in closed position and stabilized by braking means; and conversely, when said legs are progressively slid outwardly under the controlled action of the force of the clamping band to a stop abutment near the opening of the casing, they deploy into a V configuration thanks to a resilient member acting against both of them.

The great advantage provided by these new modifications of the emplacement tool will be understood, in which the release of the jaws takes place in a progressive manner, or, according to a second modification, by a controlled retraction of the tool permitting progressive opening of the two arms and hence the release of the clamping band which, moreover, is necessarily in rear abutment against the passage to resist the retraction force (which prevents any lateral shift of the clamping band along the flexible pipe at the time of its mounting), or in a third modification by using preferably the external edges of the legs of said tool, which are used as a smooth track or partially bent to provide under the force of a compressed clamping band, respectively a free guiding and sliding on one leg and a free guiding or braking on the other leg by the bias of a regulation mechanism controlled such that the assembly of the two legs, beginning from their innermost position in abutment against the rear, wherein the clamping band is totally compressed, deploy progressively outwardly under the gradual and controlled action of said mechanism.

On the other hand, given that the position of a clamping band on piping takes place most of the time under cramped conditions (vehicle assembly line), it has to be taken into account that to mount a clamping band on a flexible pipe, there is seldom sufficient space to carry out an inclined or even perpendicular retraction relative to the piping, that would be necessary correctly to use the positioning tool.

To overcome this great drawback that can be encountered with the first two modifications, it has been proposed according to an essential characteristic of the third modification, to mount on the legs of the tool rotatable jaws so as to be able at least to incline the tool at the time of its retraction to release the clamping bands; it follows that such a situation cannot be controlled other than by the gradual control of the extension of the legs thanks to the release mechanism provided in the third embodiment.

BRIEF DESCRIPTION OF THE DRAWINGS

Other characteristics and advantages will become better apparent from the description of a tool for practicing the process according to the invention, given by way of non-limiting example of the invention, with reference to the drawings, in which:

FIGS. 1 to 4 show schematically the four principal steps of the process for positioning a resilient clamping band for securement of a flexible pipe on piping from a clamping band dispenser, FIG. 11 is a cross-sectional view on the line XI—XI of FIG. 10.

DESCRIPTION OF THE PREFERRED EMBODIMENT

Figure 5:
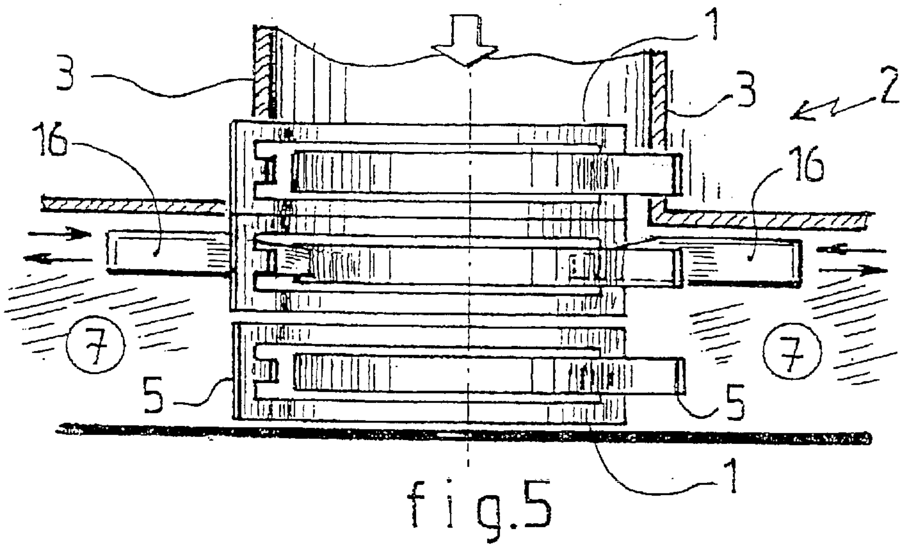
FIGS. 5 and 6 are partial schematic views, in elevation (FIG. 5), and from above (FIG. 6), of the loading system and pre-gripping of a manual emplacement tool, from the clamping band dispenser.

Referring to FIGS. 1 to 4 of the drawings, the process for positioning resilient clamping bands 1 according to the invention comprises a clamping band dispenser 2 permitting, as shown in FIG. 1, stacking the clamping bands on edge, in a vertical column 3 having substantially the external dimensions of the closed clamping band, and having a front opening 4 of a size only just greater than the spacing of the opening members for the resilient clamping bands 1, hereinafter called "lugs" 5.

The vertical column 3 opens at its lower portion 6 into a housing 7 of a height slightly greater than the width of the clamping bands 1; the lateral cutout 4 permits disengaging, while guiding them, the control lugs 5 of the clamping bands 1 which are dispensed by gravity one by one, as will be indicated later on, for their withdrawal from the housing 7 by means of a manual tool 8; this latter is provided with two jaws 9 mounted at the ends of two legs 10 which will be, before withdrawal by the user, brought together toward each other by two compression shoes 11 disposed on opposite sides of these same legs 10 and which are actuated with a lateral movement toward each other, as shown in FIG. 2, by a mechanical device preferably motorized, controlled automatically or step by step by the user.

When the legs 10 of the tool 8 have been mechanically brought together, thus causing the opening of the clamping band 1 by the approach toward each other of its two lugs 5, it is then possible; as will be pointed out later on in the description, to withdraw the tool/clamping band assembly in this position as shown in FIG. 3.

The user can then very precisely position the clamping band 1 by means of the tool 8, on a flexible pipe 12 first emplaced on a piping 13 for example of an automotive vehicle.

Finally, once positioned, the resilient clamping band 1 must be released by the tool 8 so that it resumes its original diameter and thus comes into counterlocking against the flexible pipe 12 on the piping 13. To do this, the tool 8 is provided with a release mechanism of which several modifications will be described later.

Figure 6:
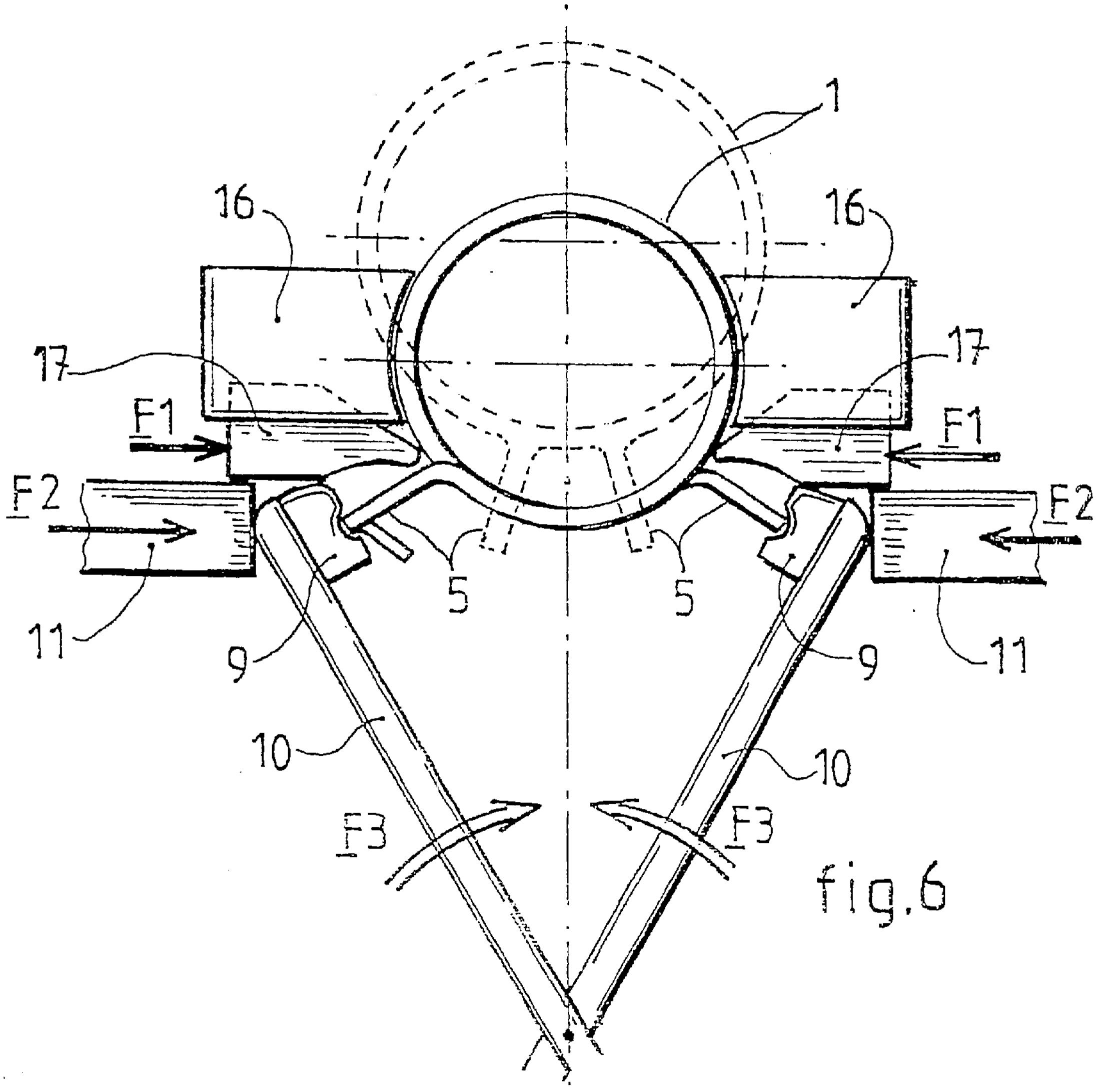

With reference to FIGS. 5 and 6, there will now be described a particularly structure of the dispensing mechanism for resilient clamping bands 1 according to the invention.

The resilient clamping bands 1 stacked on edge in the column 3 of the dispenser 2 constitute an automatic supply of clamping bands arriving in the housing 7, for example, disposed on a support table adjacent the work station; the clamping band 1 at the lower end of column 3 in the housing 7 is thus in a ready position for withdrawal by the tool 8; naturally, the preceding clamping band 1 will be held by a retractable blocking system 16 which is successively withdrawn to permit the descent of the next clamping band for withdrawal.

According to FIG. 6, showing a top plan view of the positioning of the clamping band 1 at the moment of its arrival in the housing 7 of the dispenser 2 just before emplacing the tool 8 for its withdrawal, the dispensing mechanism comprises first two positioning shoes 17 disposed on opposite sides of the lugs 5 of the lowermost clamping band 1, so as to block the clamping band 1 in this position (full lines in FIG. 6); at this time, the legs 10 of the tool 8 (not shown) can be inserted so as to cause the jaws 9 respectively to coincide with the lugs 5 of the lowermost clamping band 1. The tool 8 comes into abutment against the shoes 17 which hold the clamping band 1 in position and is guided laterally on the two shoes 11 which ultimately will serve to bring together the two lugs 5 toward each other, so as to enlarge the clamping band 1 (broken line position in FIG. 6). According to the process, assume that the jaws 9 are in good position about the lugs 5, the shoes 11 are automatically or by manual control, brought toward each other in the direction of the arrows F2 of FIG. 6; in the case of automatic actuation, the drive of the shoes 11 can be controlled by detectors of the position of the legs 10 of the tool 8 or else by pressure detectors when these same legs are in contact with the compression surfaces of the shoes 11. Once the approach of the legs is mechanically carried out by the shoes 11, the clamping band 1 is thus in the open position and it is ready to be withdrawn, not only from the shoes 11 but also from the shoes 17 so as to disengage (reversal of the movements Fl and F2) from the opening of the housing 7 and thus to extract without difficulty the pre-stressed clamping band 1.

As will be described for the various modifications which follow, the tool 8 is designed to maintain the compression of the lugs 5 of the clamping band 1 thus pre-stressed, during all the transport from the dispenser 2, to the application site of the clamping band 1.

It follows that other arrangements can be adopted, particularly as to the configuration of the dispenser 2 according to the invention; the function of the clamping band dispenser can thus be separated from the pre-gripping function obtained by approach of the shoes 11 thanks to the mechanical means, for example motorized. One could for example imagine a withdrawal of the clamping bands by the tool 8 whose jaws would be adapted to simple snapping on to the lugs 5 in the rest position, the tool and the clamping band being able then to be presented to a following station, permitting carrying out pre-clamping, which is to say the pre-stressing of the resilient clamping band 1, the rest of the process remaining the same.

There will now be described with reference to FIGS. 7 to 11, a first modification of the hand tool 8 whose mechanism permits the use of the process according to the invention.

Figure 7:
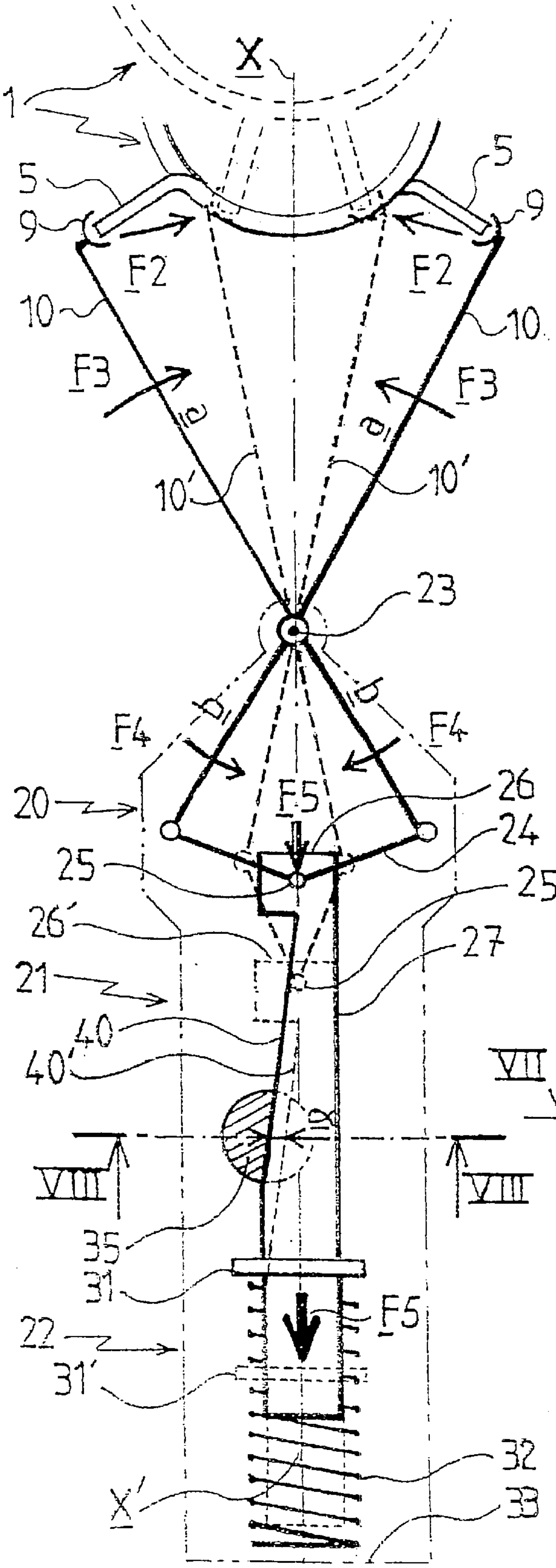
FIG. 7 shows, in a view from above and in medial cross-section, the kinematics of the principal elements constituting the first embodiment of the manual tool for extracting and positioning resilient clamping bands, between a rest position in full line and a position of extraction of the clamping bands in broken lines, FIG. 8 corresponds to a cross-section on the line VIII—VIII of FIG. 7, showing the kinematics of the pieces in a plan perpendicular to that of FIG. 7, FIGS. 9 and 10 show in medial transverse cross-section, respectively from the side (FIG. 9) and from above (FIG. 10), an extraction and positioning tool according to the invention, according to this first embodiment.
Figure 8:
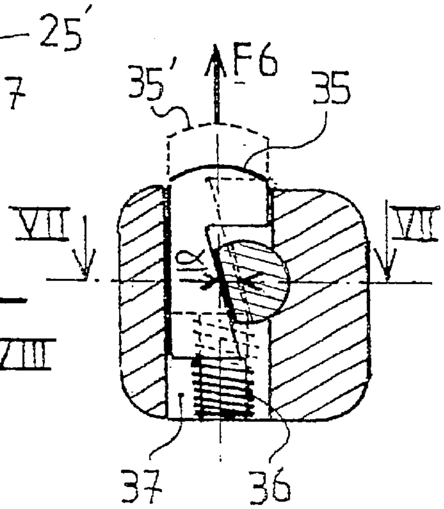

The kinematics of this mechanism are especially shown in FIGS. 7 and 8, showing respectively the tool 8 in the rest position, in full lines, and in the gripping position shown in broken lines in FIGS. 7 and 8; for easy understanding, the references connected with the constituent elements of the tool will be primed when they refer to these same elements in the working position.

Tool 8 permitting the extraction and positioning of a resilient clamping band 1 from the housing 7 of a dispenser 2, comprises a head 20 from which emerges the two legs 10 supporting the two jaws 9 shaped conventionally to be adapted to the particular shape of the lugs of the clamping bands 1 commercially available, a body 21 receiving the release control mechanism of the legs 10, finally a sleeve 22 for gripping by the user; according to a preferred arrangement of this tool 8, the head 20, the body 21 and the sleeve 22 are of overall cylindrical shape and are stacked along the same longitudinal axis XX'. The two legs 10 of a case a are articulated like scissors about an axle 23 secured to the head 20 of the tool 8; the two legs are prolonged beyond the articulation 23 for a length b according to a given ratio R=a/b which depends not only on the size of the clamping bands 1 which are used but also on the overall geometry of the tool; this ratio is easily determined by those skilled in the art during preparation of the tool. At each of the ends of the legs 10 opposite the jaws 9, is articulated a rod 24 whose length here depends again on the overall geometry of the tool which will be easily determined by those skilled in the art; the free ends of the two rods are connected and articulated about a same axle 25 secured to a head 26 connected in a manner which will be described in greater detail later, to a shaft 27 which can move along the axis XX' within the tool 8, guided by a longitudinal channel 28 provided at the center of the body 21; the shaft 27 is moreover secured to the head 26 in an upper recess 29 of the body 21 opening into a cavity 30 within the head 20 of a sufficient size to permit the lateral extension of the ends of the legs of a length b of the legs 10 when these latter deploy about their articulation 23; the shaft 27 is itself prolonged toward the sleeve 22 to come into resilient abutment 31 against a member, such as a helical spring 32 for example, which tends to return longitudinally said shaft 21 toward the head 20 of the tool 8, thereby tending to space the jaws 9 as will be explained later; a blocking system is moreover associated with the shaft 27 to permit freely and automatically its linear movement along XX' when the jaws 9 move together, which is to say when the rod compresses the resilient member 32, and, on the contrary, to prevent its reverse movement, except to actuate a control 14 provided for this purpose automatically to space the jaws 9, in the gripping position of a clamping band 1 at the lower end of the dispenser 2.

Referring to FIG. 7, there will now be described the general kinematics of the tool 8 according to this first modification: by the external action of the shoes 11 of the dispenser 2 in the direction of the arrows F2 of the drawing, the legs 10 articulated at point 23 move simultaneously in the direction of the arrows F3 thereby causing displacement F4 of their legs of a length b, the four elements of the legs thus taking the configuration in fine broken lines of the figure and it will be seen that the articulation 25 of the two rods 24 undergoes because of this movement an offset along the axis XX' of the tool toward its rear portion, which is to say toward the sleeve (arrow F5). This retraction of the articulation 25 gives rise to a rearward offset of the head 26 and hence a retraction of the shaft 27 which thus compresses the spring 32 bearing on the end 33 of the sleeve 22 of the tool 8. At this time, it is important to block the legs 10 in their gripping position, permitting as has been seen, the withdrawal and the positioning of the pre-stressed resilient clamping bands 1. This blocking is obtained by a blocking system which prevents the reverse movement of the shaft 27, which is to say rising toward the head 20 of the tool 8. To do this, and generally speaking, the blocking system of the shaft 27 is obtained by giving to said shaft an axial conicity of suitable cross-section enlarging from the head 26 to the resilient abutment 31 which will coact with a conical wedge 35 of suitable conicity with an axis perpendicular to that of the shaft 27 and which can move axially downwardly (FIG. 8) by an action of the control 14 and upwardly (by the reaction of a resilient member 36, in principle a helicoidal spring), said wedge 35 being disposed in a well 37 to be constantly in frictional engagement with the conical portion of the shaft 27 such that its smallest cross-section being upward (FIG. 8) which is to say on the side opposite the spring 36 pressing back the wedge 35 upwardly, its does not constitute a blocking brake when the shaft 27 moves to the rear of the tool by compressing the spring 32, which is to say definitively during approach of the jaws 9, and on the contrary has sufficient friction to prevent the reverse movement of the shaft 27 urged both by the gripping force of the pre-stressed clamping band 1 and by the return force of the spring 32 which it compresses.

According to a preferred configuration of the blocking system which has been described, the conicity of the shaft 27 results from a flat machined along one of its generatrices, at least for an effective length corresponding to its axial movement during maximum clearance of the free jaws 9, with a machining slope in the radial direction producing a progressive ramp 40 adapted to coact with the conical wedge 35, the slope of the ramp 40 being just calculated to obtain relative sliding with the wedge 35 in one direction and a blocking in the other direction as a function of the mechanical characteristics of the tool 8 and the clamping bands 9. Similarly, and according to another preferred modification of the invention, the conical wedge 35 is of the cylindrical wedge type with a cut surface known as a "bicycle wedge" whose upper end, of smallest cross-section, opposite the return spring 36 coming into bearing against the internal wall of the body 21 of the tool, opens freely outwardly of the body so as to be accessible by pressure exerted by the user downwardly (FIG. 8 or FIG. 11) when he desires to disengage the tool 8 from the clamping band 1 correctly positioned on the flexible pipe, a control trigger 14 preferably being able to lessen the force necessary to push back said wedge 35.

There will now be described the conjoint action of the shaft 27 and the wedge 35: when the shaft 27 returns toward the sleeve of the tool at the time of pre-gripping of the legs 10, it will be seen in FIG. 7 that the ramp 40 passes from a position in full line to a position 40' in broken lines, thereby freeing in the well 37 guiding the wedge 35 if it does not swing, a space, corresponding to the radial spacing a between the two positions, which naturally, the wedge 35 immediately fills by rising in the direction of arrow F6 of FIG. 8 thanks to its return spring 36 and its path upward is thus limited only by the sufficient inclination of the cut surface. It will thus be understood that this new position is irreversible, which is to say that the shaft 27 cannot advance further, because it would then press downwardly the wedge 35, however this movement is impossible because it would cause friction which is very much greater than the return force; naturally the slopes of the wedge and the ramp 40 of the shaft 27 are accordingly calculated. Precisely, the wedge 35 plays the role of a wedge to block the forward translation of the shaft 27. Only a downward vertical and transverse pressure on the wedge 35 in the direction opposite the arrow F6 in FIG. 8, could again disengage a space $\alpha$ giving rise immediately to freeing the shaft 27 which could thus rise toward the head 20 and open by the effect of the rods and of the scissors, the legs of the jaws 9 which place the tool in the rest position ready to perform a new withdrawal of a clamping band from the dispenser 2. According to a preferred embodiment, there is provided in line with the wedge 35 a trigger 14 secured to the body 21 of the tool, providing a bearing lever for controlling release.

Referring to FIGS. 9 and 10, there will now be described several embodiments of the tool 8 according to its first modification. According to a first embodiment, the head 20 of the tool 8 can be totally pivoted on itself about the longitudinal axis XX', thereby permitting pivoting in all directions of the space of the plane containing the two legs 10 supporting the jaws 9. This improvement of the tool is particularly advantageous to avoid any twisting of the hand of the user both at the time of withdrawal of the clamping bands and at the time of their positioning.

The rotation on itself of the head 20 about the axis XX', about a circular rail 41 at the end of the body 21 of the tool, is rendered possible thanks to the particular mounting of the head 26 which is naturally driven by the rotation of the head 20 at the same time as the legs 10, about the head 42 of the shaft 27 which can not undergo any rotation about itself by reason of its ramp 40 which must rest facing the ramp of the wedge 35; such a mounting is for example obtained by the coaction of a shaft head 42 which is flared to provide a shoulder coacting with a recess provided at the base of the head 26 surrounding just the head 42 of the shaft such that it ensures mutual rotation of the two members but prevents any axial translation.

According to another important form of this first modification, the legs 10 of the tool 8 supporting the jaws 9 can be inclined at an angle varying from 0 to 90° relative to the plane that they define when they are straight in accordance for example with FIGS. 9 and 10 of the drawings. It follows that the inclination of the legs 10 can be effected definitively upon construction of the tool 8 or else, according to a conventional construction well known to those in the art, can be adjusted as desired by the user from a vertical position of FIGS. 9 and 10 to a final position at 90° permitting lateral gripping of the resilient clamping bands. Naturally, the single or variable inclination of the legs 10 can be associated with the rotatable head 20 described in the preceding embodiment, to form a particularly universal tool.

According to a secondary characteristic, it is possible to adjust the pressure on the shaft 27 by the spring 32 giving rise to the release of the jaws 9 so as to place the tool 8 in gripping or rest position; to do that, there can be provided axial adjustment of the abutment 31 mounted at the end of the shaft 27 thanks to a cap positionable by a nut 44 coacting with the end of the shaft 27, screwthreaded for this purpose.

According to a second modification, the autonomous positioning tool 50 according to the invention which will now be described with reference to FIGS. 12 to 20, uses all the steps of the positioning process for resilient clamping bands described above. For easy comprehension of the pieces and portions of pieces cited in the description which follows, and which are already used in the first embodiment, the same reference numerals will be used.

As in the first modification, the tool 50 coacts with a dispenser 2 for clamping bands 1, arranged at a fixed position so as to preload them, which is to say to open them, bringing their control members, the lugs 5, together, by means of two compression shoes 11 actuated with lateral movement toward each other by a mechanical device which is preferably but not necessarily power driven, which can be controlled automatically or step by step by the user himself.

An example of a dispenser 2 provided with power driven and automatically controlled compression shoes coacting with the manual tool 50, is shown in the accompanying FIGS. 17 and 18; its operation will be described later.

Figure 12:
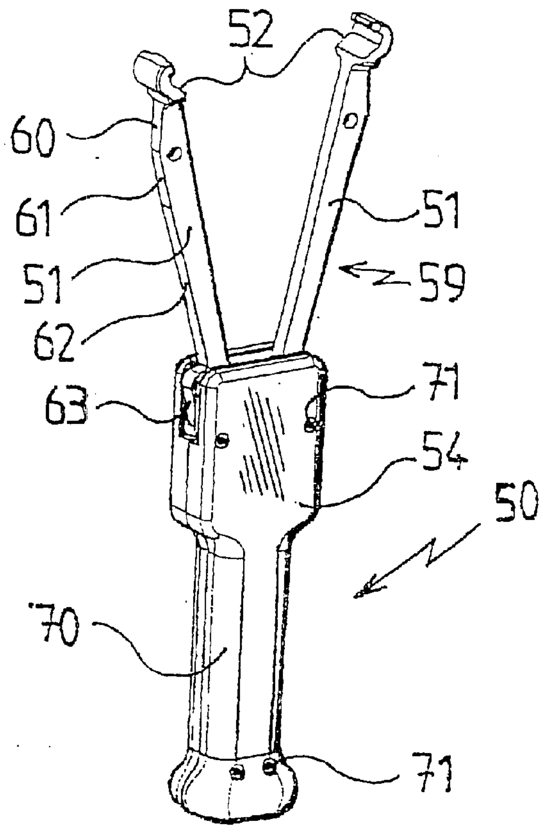
FIG. 12 is a perspective view of a positioning tool according to the invention, according to a second modification, the legs being deployed in the ready position for the extraction of a clamping band.
Figure 13:
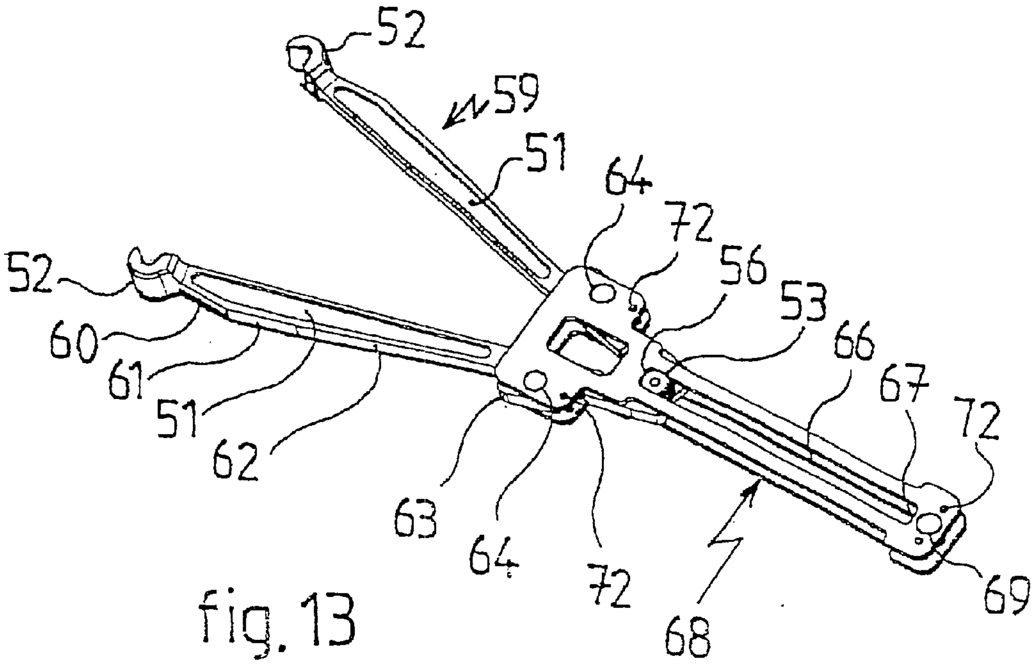
FIG. 13 is an isometric view of the internal mechanism of the tool of FIG. 1, showing its operation.
Figure 14:
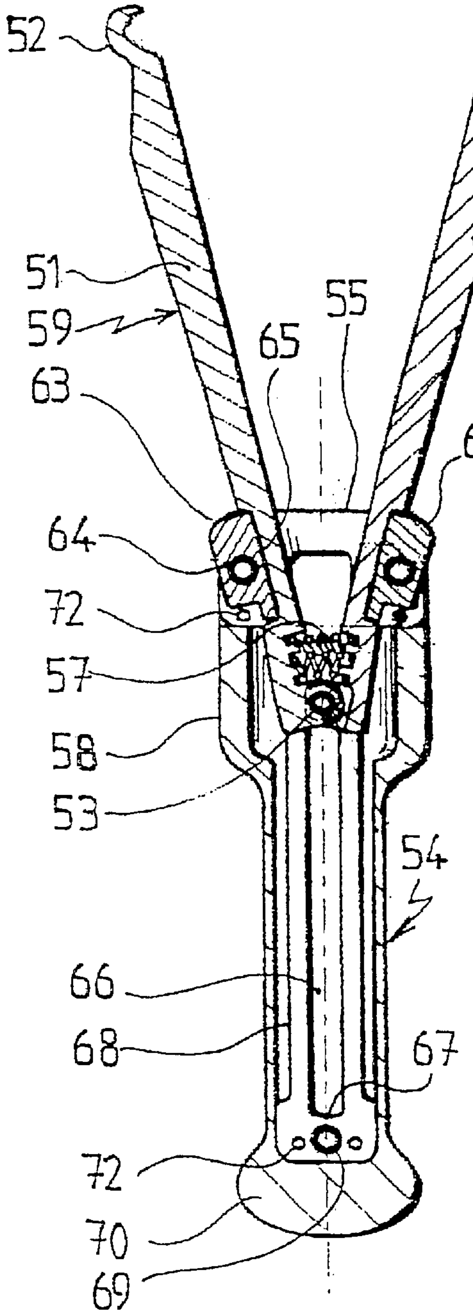
FIG. 14 is a cross-sectional view of the tool of FIG. 1 along the axis of symmetry passing through the plane of its legs.
Figure 15:
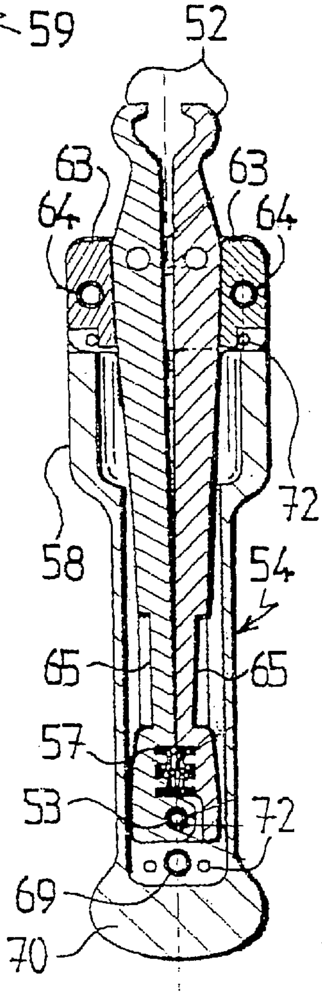
FIG. 15 is a view identical to the preceding view, in which the legs are respectively in working position and within the tool.
Figure 16:
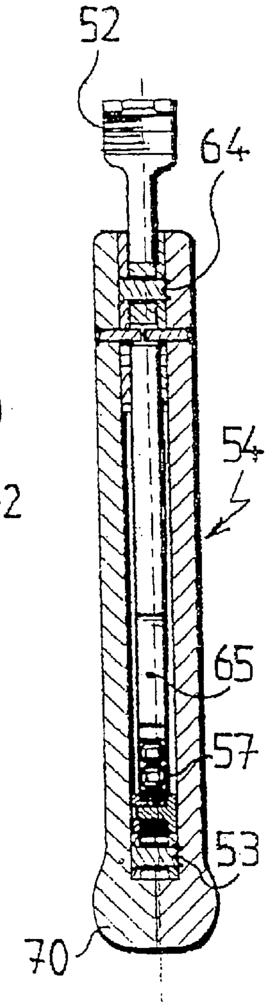
FIG. 16 is a cross-sectional view of the preceding figure, passing through the plane of symmetry perpendicular to the plane of the legs.

With reference to FIGS. 12 to 16, there will now be described the positioning tool 50: the latter comprises two legs 51 normally identical, provided at one of their ends with jaws 52 mounted facing each other to be adapted to lugs 5 of a conventional resilient clamping band; at their other end, the legs 51 are articulated to each other in the plane that they form along an axis 53 which itself is perpendicular, to open freely between a closed position in which the jaws 52 open the clamping band 1, to a position extended as of V, which positions the same jaws to engage or disengage the lugs 5 of the clamping band 1 respectively at the bottom of the dispenser 2 or discharged after positioning; as shown in FIG. 13, the articulation axle 53 of the two legs 51 is slidably mounted along the axis of longitudinal symmetry of the legs 51 within a casing 54, outwardly shaped to serve as a gripping member for the tool 50 and internally such that when the legs 51 are within said casing 54 and in abutment with the bottom of the same casing, only the jaws 52 emerge from the opening 55 of the casing 54 at a distance shown in FIGS. 15 and 16, sufficient to keep the lugs of a clamping band 1 in good position; at this time, the legs 51 are in the closed position against the internal side walls of the casing 54; the tool 50 is thus in autonomous position for work consisting, as will be pointed out later, in extracting a clamping band 1 from the dispenser 2, bringing it onto a flexible pipe in its open position to proceed to its positioning on piping before release of the clamping band; to this end, and conversely when the legs 51 of the tool 50 are slid toward the outside of the casing 54 until reaching a stop abutment 56 near the opening 55 of the casing, they are thus located in deployed V shaped position as shown in cross-section in FIG. 14, thanks to a resilient member 57 pressing them back against the internal side walls of the casing 54 which for this purpose has at least an enlargement 58 in its opening 55.

According to an essential characteristic of the present modification, the articulated legs 51 each have along their external edge 59 at least one series of three facets 60, 61, 62 that are flat and perpendicular to the plane of the legs 51 when they are deployed, connecting with a convex profile as shown on the left leg in FIGS. 12 and 13 particularly; a first facet 60 extends from the jaw 52 to within the leg 51 to flare outwardly over a distance corresponding to the remaining external portion when the legs 51 are in abutment within the casing 54 as shown in FIGS. 15 and 16; a second facet 61 is connected to the first at an angle bringing it into a position parallel or slightly re-entrant relative to the vertical plane of symmetry of the V of the legs 51 over a distance which will be recited later; finally, the third facet 62 is connected to the second at an inward inclination of a gentle slope in the direction of the articulation axis 53. Shoes 63 of maximum width a are mounted on pivots 64 perpendicular to the plane of the legs on opposite sides of the internal side walls of the enlarged portion 58 of the opening 55 of the casing 54 to coact with the second and third facets 61 and 62 of the legs, respectively, to create first a sufficient braking of the legs 51 when these latter are in abutment within the casing 54 and hence urged to the maximum by the resilient force of the open clamping band which tends by this fact to press them back toward the exterior of the casing, and on the other hand, to facilitate the extraction of the legs 51 outside the casing 54 at the time of depositing the clamping band 1 on a flexible pipe 12 by balancing and rendering progressive the deployment of said legs 51.

According to a second characteristic of the tool 50, there is provided a groove 65 along the lower portion of the third facet 62 of each leg 51, permitting each shoe 63 to be enclosed in the corresponding leg 51 corresponding to the time when the articulation axle 53 of the deployed legs arrives in abutment at 56 on a side of the opening 55, creating an abrupt increase in the opening of the same legs 51; at this time, the jaws 52 are totally disengaged from the lugs 5 of the clamping band 1 which is completely emplaced on the flexible pipe 12, which permits retrieval of the tool 50 for a new operation at the dispenser 2. Moreover, the reception of the shoes 63 in the grooves 65 constitutes a temporary holding position of the legs 51 which thereby benefit from a stability of opening with respect to external forces on the tool, for example at the time of emplacement in the dispenser 2 as will be pointed out further on.

There will now be described a modified embodiment of the mechanism of the tool 50 with reference to FIG. 13. The two legs 51 machined of special steel to produce the jaws 52 and the different facets 60, 61, 62 as well as the groove 65 according to the characteristics detailed above, are articulated to each other to be deployed in a V shape thanks to a pivot 53 perpendicular to the plane of the legs and passing on opposite sides of this plane to serve as sliding lugs between two superposed openings 66 extending along the axis of symmetry of the tool over a distance comprised between a lower abutment 67 corresponding to the position of the tool when its legs are brought together within the casing 54 and an upper abutment 56 corresponding to the position of the legs completely deployed in V shape as pointed out above; naturally, the axle 53 for articulation of the legs slides without play between these two abutments 56, 57.

The two openings 66 are provided on two metallic members 68 preferably identical to each other and of general T shape, cut out from sheet metal to constitute the framework of the internal mechanism of the tool 50. Between the transverse portions of the T of the members 68, are mounted on pivots 64 two shoes 63 such that these latter can oscillate freely on opposite sides of the facets 62 of the external edge 59 of each leg 51 which are constantly held in position against said shoes 63 thanks to a pair of spiral springs 57 mounted in recesses provided for this purpose just above the articulation axle 53. The two members 68 are held one above the other by two articulation axles 64 of the shoes 63, serving as a crosspiece in the upper portion of the T and by a crosspiece of the same type 69 provided at the lower end of the members 68.

Thanks to this extremely simple mechanism, it is possible easily to obtain the two functional positions of the legs 51, either deployed as a V as shown in FIG. 13, or regripped by pushing on the legs 51 to move the articulation axle 53 toward the lower abutment 67 with the result of bringing together the two legs 51 about the shoes 63 which contribute to holding it in closed position as has already been indicated. Finally, there are provided two shells 70 preferably identical and of a plastic material, to adjust themselves about the two T shaped members 68 and to be fixed by means of screw 71 in screw-threaded bores 72 preferably provided on said members 68.

With reference to FIGS. 17 to 20, there will now be explained the particular operation of the tool according to the second embodiment, in coaction with the dispenser 2, to carry out gripping of a flexible pipe 12 on piping 13.

Figure 17:
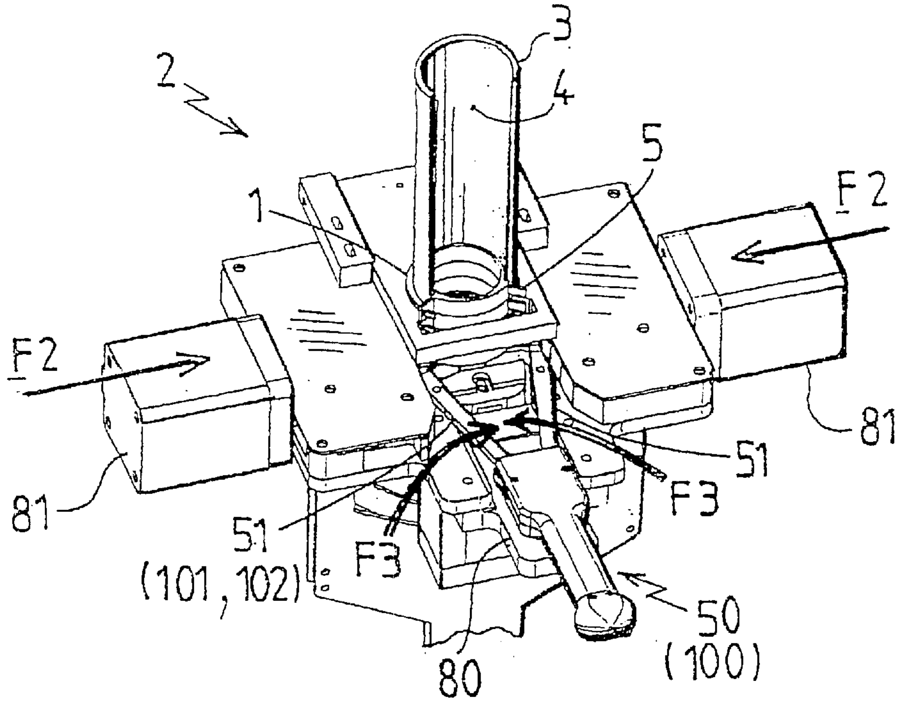
FIGS. 17 and 18 are perspective views of an automatic dispenser for clamping bands, usable in coaction with this second embodiment of tool in the initial position (FIG. 6) and in the final position before extraction (FIG. 7)

With reference to FIG. 17, the legs 51 of the tool 50 are in deployed position, which is to say in the position for extracting clamping bands on the platform 80 of the dispenser 2. The tool 50 enters the dispenser with a transverse movement P (FIG. 18) about the lugs 5 of the clamping band 1 at the lower end of the internal housing, such that the jaws 52 of the tool come into contact with the two compression shoes 11 automatically actuated by two jacks 81 disposed facing each other and preferably actuated when the tool 50 is well positioned; it follows that the dispenser 2 could be constituted by different means than those shown in FIGS. 17 and 18; in particular, the jacks 81 actuating the shoes 11, could be replaced by a manual mechanism which demultiplies the action of the foot or the hand of the user in an environment in which it would be difficult to provide a source of compressed air for example; similarly, there is here provided a supply of clamping bands that are stacked in the column 3 of the dispenser 2 but this device could be changed for a simpler arrangement in which the clamping bands 1 would be disposed one by one, directly on the internal housing of the dispenser 2 in proper position to be grasped between the jaws 52 of the tool 50, as pointed out above.

Figure 18:
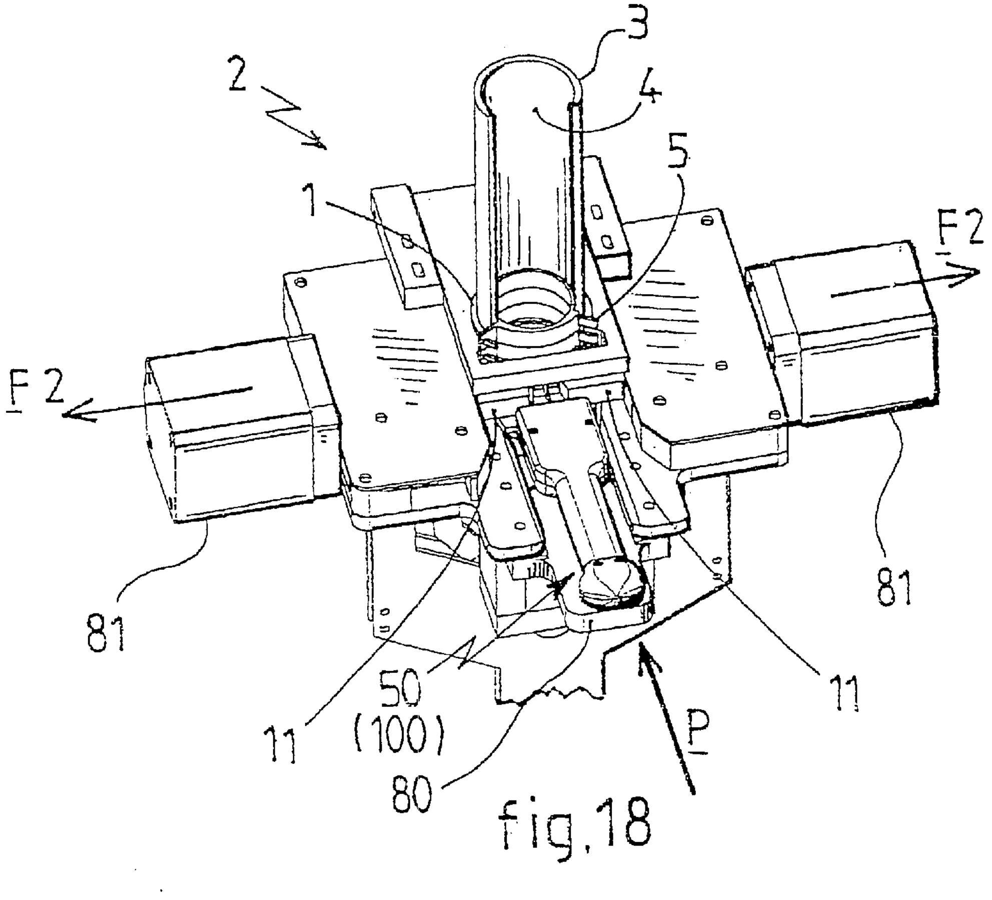
Figure 19:
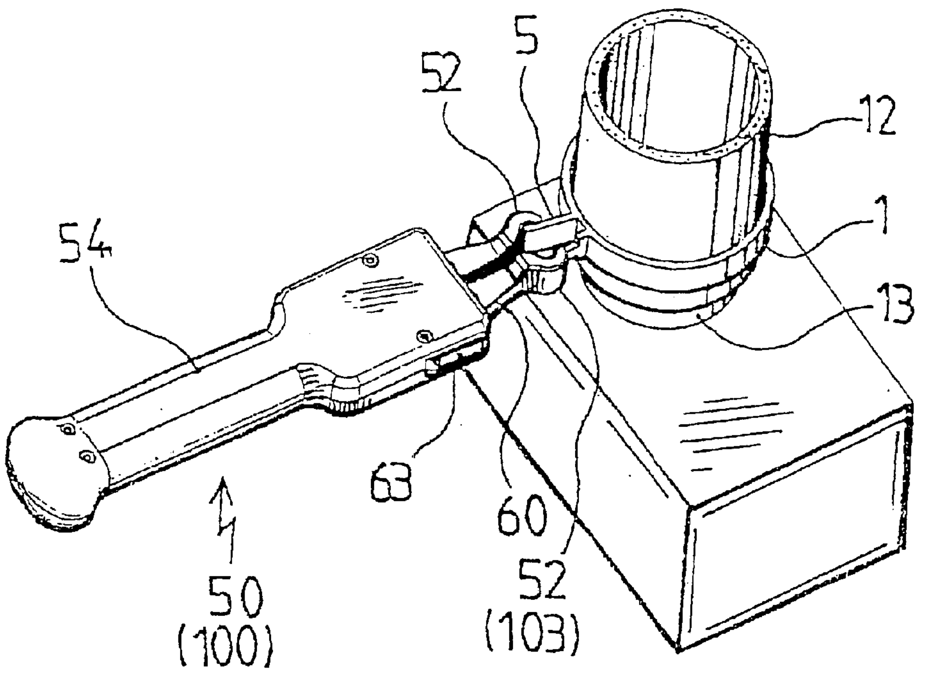
FIG. 19 is an example of the application of positioning of a clamping band on a flexible pipe by means of the tool according to the second embodiment in its working position.
Figure 20:
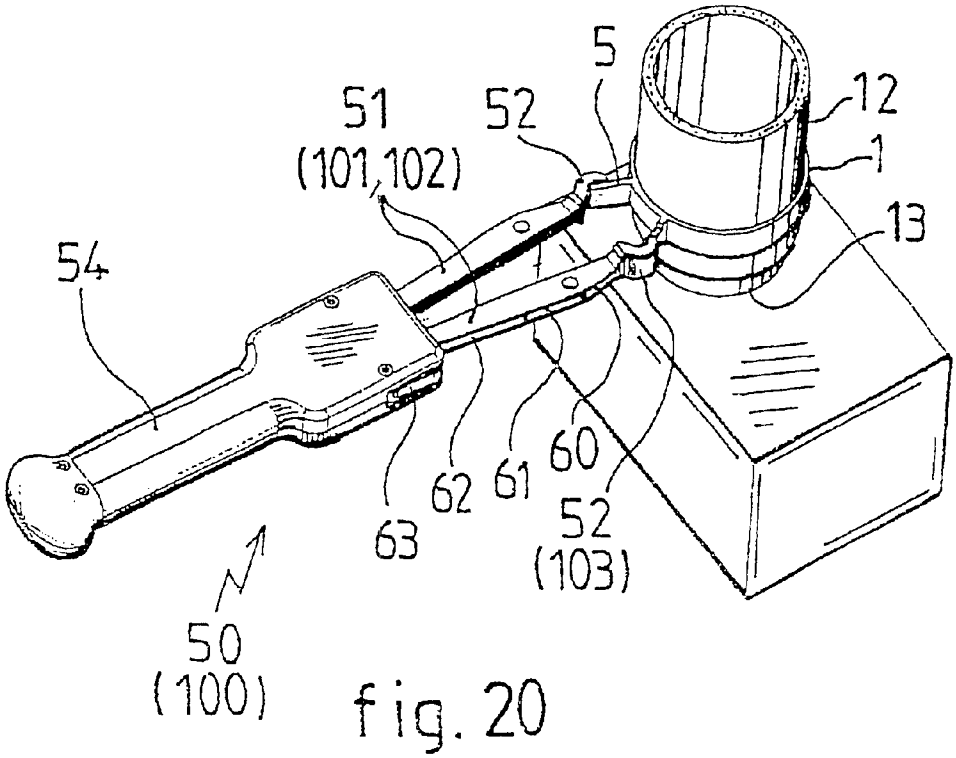
FIG. 20 is a view identical to the preceding one, the tool being in the final retracted position just before its disengagement from the lugs of the clamping band.

When the shoes 11 have been actuated in the direction of the arrows F2 of FIG. 17, the tool 50, whose legs 51 have been brought together in the direction of arrows F3 of FIG. 17, is in the position of FIG. 18, it then suffices for the user to press inwardly of the dispenser 2 (in the direction of arrow P, FIG. 18), the handle of the tool 50 such that the legs 51 enter the interior at the bottom of the casing 54 as has been explained above; it will be noted that the guiding and braking shoes 63 of the legs 51 are naturally ineffective at this time, because the two legs have been brought together, which is to say disengaged from the groove 65. Thus, when the handle of the tool 50 has been totally pressed against the platform 80, (FIG. 18), these means actuate the dispenser 2 and in particular the jacks are then released and the shoes 11 withdrawn from the jaws 52, which remain in clamped position, which is to say in the position to open the clamping band 1, because at this time, the legs 51 within the casing 54, are again in straight contact with the shoes 63 which, thanks to the convexity of the legs, are located directly in contact with the facet 61, which produces sufficient braking to oppose the force created by the compression of the clamping band which tends to press back the legs outwardly of the tool 50; the latter is thus in the position shown in FIGS. 15 and 16. Naturally, the reverse movement in the direction F2 (FIG. 8) of the jacks 81 to disengage the shoes 11 on each side of the jaws 52, is preferably controlled by position detectors such that the tool 50, and more specifically its casing 54, will be located in good position on the platform 80. It will be further noted here, as in the preceding modification, that in case of breakage of the clamping band at the time of its compression, there is no danger for the user because the ejection of the clamping bands or portions of clamping bands takes place within the dispenser 2.

Naturally, when the shoes 11 are retracted, it then suffices to extract in the direction of the arrow T (FIG. 18) the tool-clamping band assembly, which can thus be transported from the dispenser 2, to the emplacement position, because this assembly is totally autonomous. According to FIG. 19, the tool-clamping band assembly is disposed about the flexible pipe 12 which is pre-threaded over the piping 13, and it will be seen that it is easy to position the clamping band 1 at the place provided by the manufacturer, given the small size of the tool 50. When the clamping band 1 is well positioned, it then suffices to retract, according to arrow R of FIG. 20, the handle 54 of the tool 50, by bearing on the clamping band 1 which is necessarily against the flexible pipe 12 and which accordingly can no longer move laterally during the discharge operation, which constitutes an improvement relative to the preceding tool. The retraction of the handle 54 moreover takes place very progressively thanks to the arrangement of the shoes 63, which slide along the legs 51 from the braking facet 61 in the gripped position to the end of the inclined facet 62, ensuring progressivity of retraction; here again, when the shoes describing the inclined facet 62 arrive at the level of the slot 65, there is again created an abrupt opening of the legs 51, finally disengaging the lugs 51 of the clamping band 1 which remains in proper position on the piping.

It follows that the legs 51, which are in principle straight, could have in particular cases curvatures to facilitate the emplacement of the clamping bands 1; there is thus no reason that the end portions of the legs 51 could not be inclined or inclinable between 0 and 90° relative to the plane defined by the latter when they are straight, whereby the operation of the tool 50 would not be affected.

There will now be described with reference to FIGS. 21 to 40, a third embodiment of an extraction and positioning tool 100 using the assembly of steps of the assisted positioning process for resilient clamping bands according to the invention. For good understanding, the parts and portions of parts mentioned in the description which follows and which were found in the preceding embodiments, will be given the same reference numerals.

As before, the tool 100 coacts with a dispenser 2 of resilient clamping bands 1 arranged at a fixed station to precompress the clamping bands 1, which is to say to open them by bringing together their control members called lugs 5 by means of two pressers or compression shoes 11 actuated with a lateral movement toward each other by a mechanical device, preferably but not necessarily motorized, which can be controlled automatically or step by step by the user.

Figure 21:
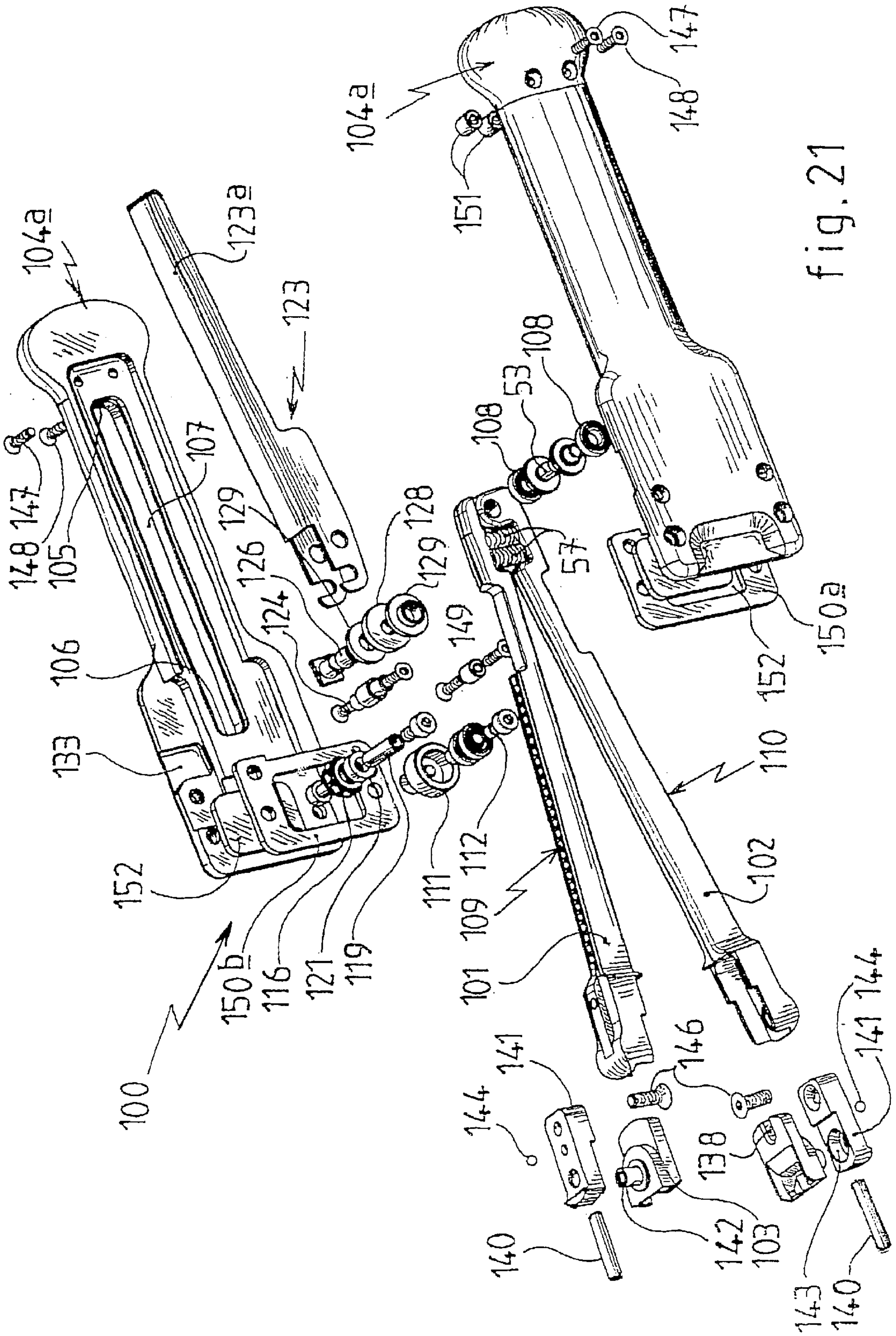
FIG. 21 is an exploded view of the third embodiment of a positioning tool according to the invention, shown in perspective and showing all the pieces of the embodiment in relative position.
Figure 24:
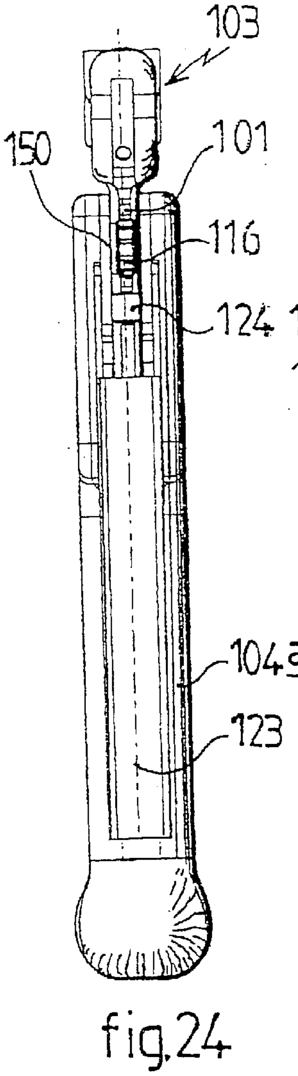
FIG. 24 shows the positioning tool of the preceding figure, from above.
Figure 23:
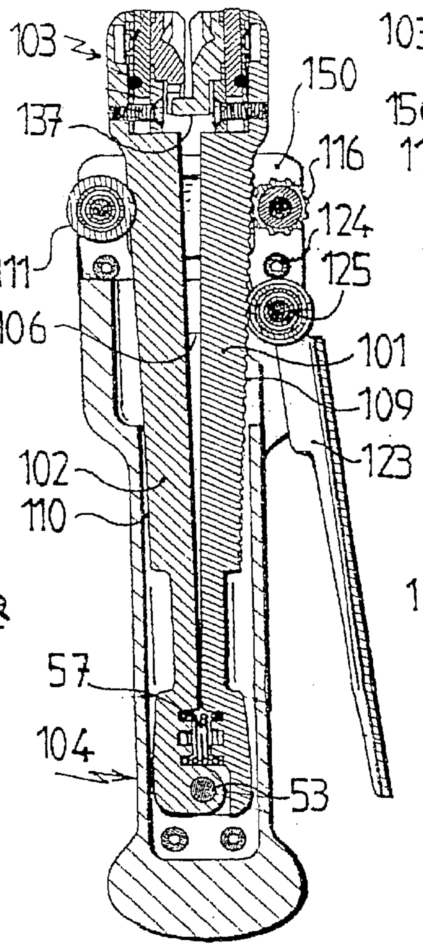
FIG. 23 is an elevational and medial cross-sectional view of a second arrangement of the tool according to the third modification, in which regulation is in this case obtained by a toothed wheel.
Figure 22:
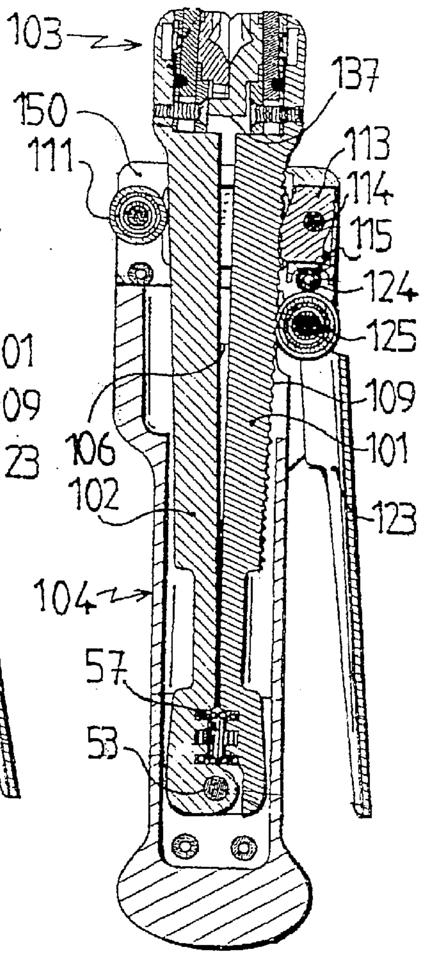
FIG. 22 is an elevational and medial cross-sectional view of a first arrangement of the tool according to this third modification in which the adjustment of the release mechanism is obtained by a shoe.

With reference to FIG. 21, the tool 100 also comprises two legs 101 and 102 provided at one of their ends, so called head of the leg, with jaws 103 comprising means which will be described later on, to adapt them to the lugs 5 of a resilient clamping band 1; at their other end, the legs 101 and 102 are articulated to each other in the plane which they form, thanks to an axle 53 which is perpendicular to them so that they can open freely under the force of the clamping band 1, from a near position in which the jaws 103 maintain the compression of the clamping band, to a position deployed in V shape permitting said jaws either to engage or to disengage the lugs 5 of the clamping band 1, according to whether the latter is respectively in position in the fixed dispenser 2 or released after its emplacement on a flexible pipe 12; different means which will be described in greater detail later, are provided such that, when the legs 101 and 102 are mounted by sliding their articulated ends along their longitudinal axis within and at an abutment 105 at the bottom of, a casing 104, only the jaws 103 emerge from the opening of said casing with which the legs coact to be held as shown in FIGS. 22 and 23, in a near position and stabilized thanks to the braking means which will be described later and conversely, when said legs are progressively slid outwardly under the controlled action of the force of the clamping band to a stop abutment 103 near the opening of the casing 104, they deploy in a V shape thanks to a resilient member 57 pushing them apart.

Figure 29:
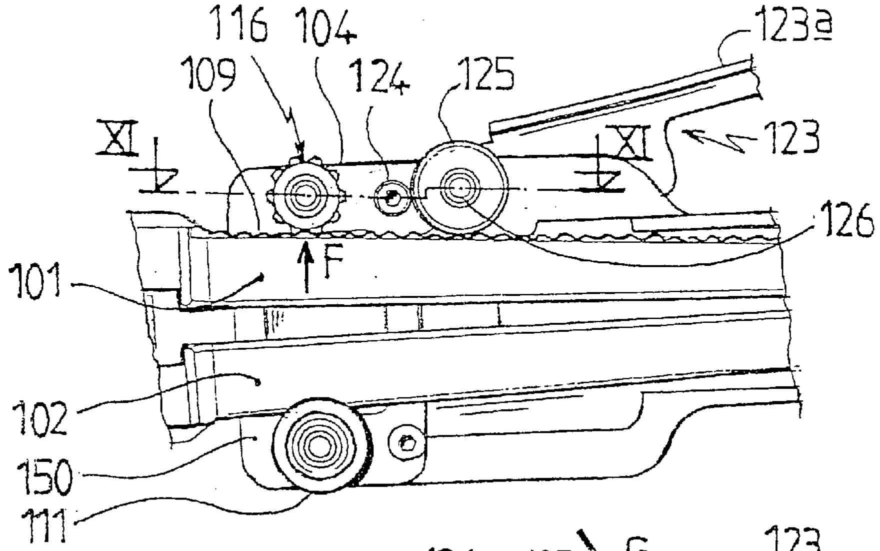
FIGS. 29 and 30 are fragmentary schematic views on a larger scale of the toothed wheel adjustment system of the positioning tool in its third embodiment.
Figure 30:
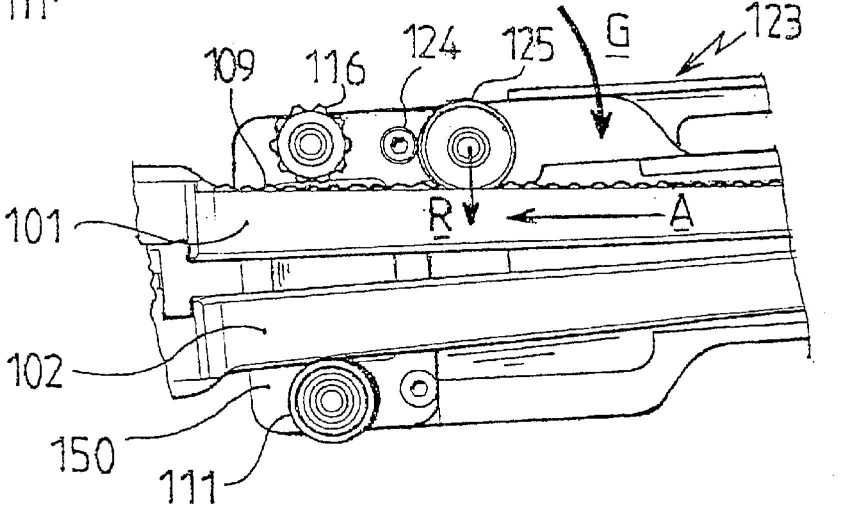

According to a characteristic configuration of this modification of the tool, the longitudinal sliding means for the two legs 101 and 102 within the casing 104 are provided on the one hand by sliding of the articulation axle 53 between two opposite grooves 107 for example sunk in the internal wall of the casing 104 and it is preferable to provide at the ends of the articulation axle 53 ball bearings 108 ensuring better coaction with the guide grooves 107; on the other hand, the legs 101 and 102 are guided in their sliding by two abutments which are positioned transversely to the opening of the casing 104 on opposite sides of the legs 101, 102 whose external edges, respectively 101 and 110, are machined to constitute for one 102, a smooth track and for the other 101, a track that is at least partially notched, effecting under the force of a compressed clamping band a free guiding and sliding along the leg 102 and a free guiding or braking along the leg 101 by the bias of a control regulation mechanism (of which a preferred embodiment will be described later on with reference to FIGS. 29 and 30), thanks to which the two legs 101 and 102, leaving their innermost position on abutment 105 at the rear end of the grooves 107 in which the clamping band 1 is totally compressed, progressively deploy outwardly until the articulation axle 53 arrives at abutment 106, at the other end of the grooves 107 beside the opening and located at a good distance forwardly of the transverse abutments, limiting the angle of opening of the legs to a V shape of a value sufficient to permit disengagement of the lugs 5 of the clamping band 1, when the latter is in place on the flexible pipe.

As in the preceding embodiments, the legs 101 and 102 of the tool 100 are machined from flat steel in the general shape shown in the figures; it follows that the sizes, lengths, width and thickness will be easily computed by one skilled in the art to ensure the mechanical strength of the positioning tool given the ranges of clamping bands which will be positioned by the tool; thus, the external edges 109 and 110 of the legs will coincide in principle with the thickness of each leg.

With reference to FIGS. 22, 23, 27 to 31, the transverse abutments coacting with said external edges are constituted, for the leg 102 whose external edge 110 is machined smooth, by a smooth roller 111 freely turning about an axle 112 perpendicular to the plane of the legs and secured to the body of the tool, thereby giving the leg 102 a free guiding during its sliding. As to the other leg 101, called hereinafter the notched leg, and according to a first embodiment shown in FIG. 22 of the drawings, the transverse abutment coating with the external edge 109 that is at least partially notched, is constituted by a fixed shoe 113, secured to the body of the tool substantially at the same level as the smooth roller 111 forming the other transverse abutment and coming into contact with the notched track 109 to constitute a brake to the natural tendency which the legs have to deploy outwardly when they are subjected to the load of a precompressed clamping band as shown for example in the intermediate position in FIG. 27. The shoe 113 is constituted of a resilient material, for example an elastomer mounted with slight rearward bias on a pivot 114 perpendicular to the plane of the legs to come into resilient bearing against the notched portion of the leg 101 thanks to an adjustment wedge 115.

According to a second preferred arrangement of the invention, the transverse abutment coacting with the notched edge 109 of the corresponding leg 101 is, with reference to FIGS. 23 to 31, constituted by a toothed wheel 116, located above the notched leg 101 and coplanar with the latter, having an access O perpendicular to the direction of movement A (FIG. 26) of said leg. The toothed wheel 116 comprises a toothed crown 117 having at its periphery a regular alternation of teeth 117*a* separated by hollows 117*b*. The pitch of the teeth 117*a* of the toothed crown 117 is equal to the pitch of the teeth 101*b* of the notched leg 101 and the teeth 117*a* of the toothed crown 117 are in engagement, in the lower portion of said crown 117, with the teeth 101*a* of the notched leg 101 as appears in FIGS. 25 and 26. The toothed crown 117 has a coaxial bore 118 which is traversed by a fixed support shaft 119 with an axis $O_1$ parallel to the axis O. The support shaft 119 has a fixed diameter less than that of the bore 118 of the toothed wheel 116 such that there exists a radial play between the internal surface of the bore 118 and the external surface of the shaft 119, this play, which could be left free in theory, being, in the present embodiment, filled with an element of resilient material, preferably an elastomer, as will be mentioned later on. Because of this, the toothed crown 117 can move transversely relative to the central fixed support shaft 119, over a small distance (O, $O_1$).

Figure 25:
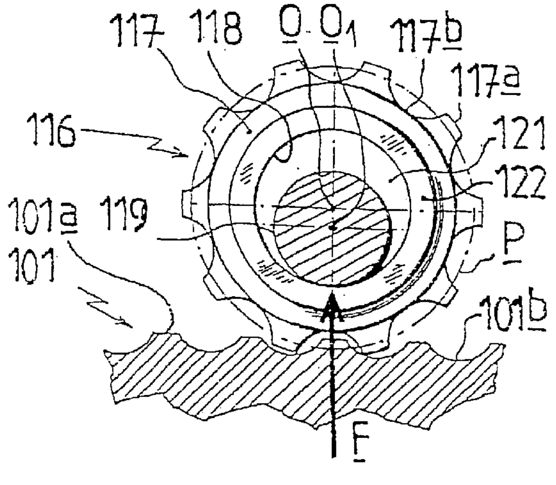
FIG. 25 is a transverse cross-sectional view on a larger scale, of the regulating toothed wheel of the tool shown in FIGS. 23 and 24, coacting with a portion of a notched leg, in the eccentric lockage position.
Figure 26:
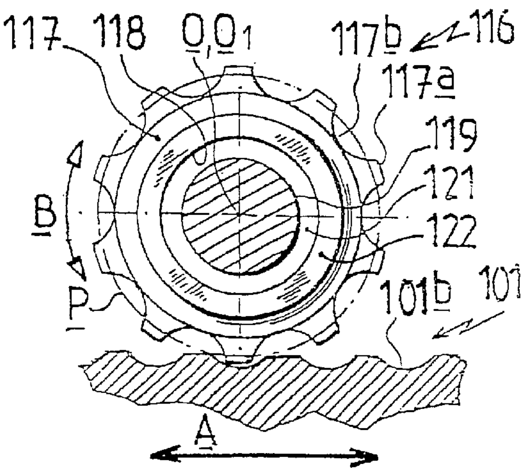
FIG. 26 is a transverse cross-sectional view of the toothed wheel shown in FIG. 25, in the centered blocking position.

There will now be explained the operation of the device for blocking/unblocking the legs of the tool provided with a toothed wheel 116 as shown in FIGS. 25 and 26. In FIG. 25, the device is in the blocking position in which the toothed crown 117 is eccentric relative to the fixed support shaft 119. In this case, the notched leg 101 is subjected to a force F directed upwardly, which is to say toward the axis $O_1$ of the support shaft 119, resulting from the stress of the pre-compressed clamping band 1, so that this notched leg 101 has been moved to the upper position and exerts a pressure on the toothed crown 117. As a result of this pressure, the toothed crown 117 is pushed upwardly and the internal surface of its bore 118 is applied against the lower generatrix of the fixed support shaft 119 to which it is tangential. In this position, the axis O of the toothed wheel 116 is located at a certain distance above the axis $O_1$ of the shaft 119, because of the movement of the notched leg 101 and the toothed crown 117 upwardly, until this crown 117 comes to bear against the shaft 119; the summit of the tooth 101*a* of the notched leg 101, which is engaged in the lower hollow 117*b* of the toothed crown 117, is thus located within the pitch circle P of the teeth 117*a,* shown in broken lines in FIGS. 25 and 26, so that the two teeth 117*a* of the toothed crown 117 which are the lowest, are blocked in the two corresponding adjacent hollows 101*b* of the notched leg 101. As a result, a mutual blocking of the notched leg 101, and of the toothed wheel 116, with the result that the notched leg 101 is immobilized.

On the other hand, when the force F is no longer exerted on the notched leg 101, which is to say when the swinging mechanism is actuated which will be described later and which is shown schematically in FIGS. 29 and 30, the leg 101 thus returns to a low position shown by arrow H (FIG. 26) in which the summits of its teeth 101*a* are located outside the pitch circle P such that the teeth 117*a* of the toothed crown 117 are no longer blocked in the notches 101*b* of the notched leg 101. The toothed wheel 116 can then turn freely in both directions of the arrow B (FIG. 26) by floating about the fixed shaft 119 in a substantially centered position and the toothed leg 101 can thus move freely in translation in the direction of the arrow A (FIG. 6).

According to a particular characteristic of this modified embodiment, it has been seen that the radial play between the bore 118 and the toothed crown 117 and the shaft 119 is preferably filled by a resilient ring 121 (FIG. 31) for example of elastomer, which is sufficiently compressible to permit the necessary transverse offset of the toothed wheel 116 relative to the shaft 119.

When the notched leg 101 is pressed against the toothed wheel 116, by exerting the force F (FIG. 25) there is a compression of the resilient ring 121 and the blocked condition returns. On the contrary, as soon as the pressure of the leg 101 weakens or becomes zero, the toothed wheel 116 immediately self centers, which permits avoiding the "drag" effect of a free pinion, (the toothed crown 117), at the moment of engagement/disengagement of the teeth (vibration, noise, etc . . . ) and performs a more rapid and more precise operation when the device is used in a very repetitive or gradual manner, (blockage/unblockage corresponding to each advance of a tooth of the toothed wheel 117).

According to a secondary characteristic of the invention, the toothed crown 117 of the toothed wheel 116 is associated with two bored lateral flanges 122, forming together a recess adapted to receive, through the bore, the resilient ring 121 mounted on the support shaft 119 fixed to the casing 104, the diameter of the bore of the flanges 122 being computed so as to obtain at least a sufficient displacement to create the blocking effect and, at the maximum, to limit the compression of the ring 121 and thus to avoid its deterioration, during heavy loading resulting from use with large clamping bands 1.

Figure 31:
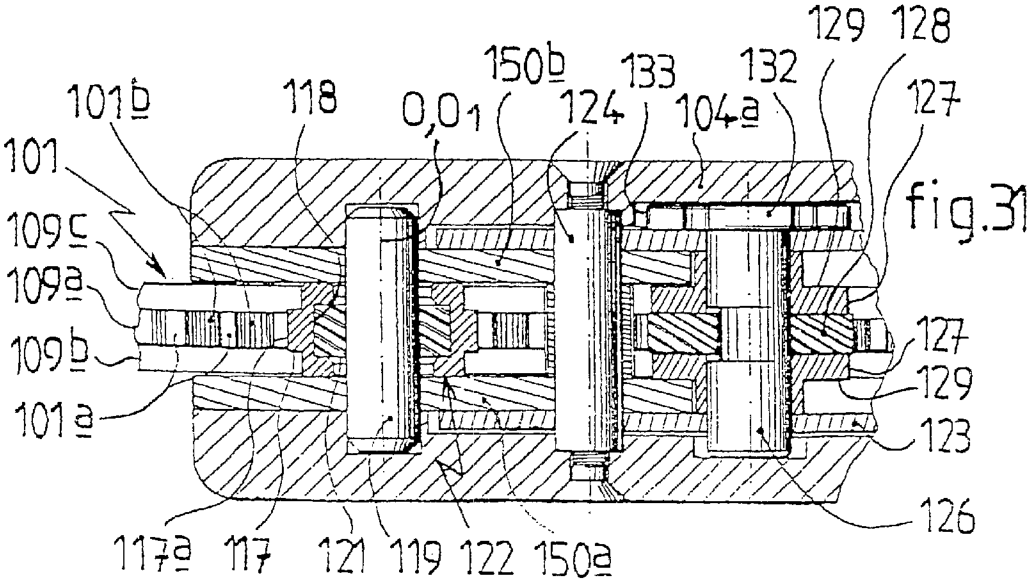
FIG. 31 is a fragmentary view on a larger scale of the portion corresponding to the adjustment member in the cross-sectional plane XI—XI of FIG. 29.

There will now be described with reference to FIGS. 29 to 31, the swinging mechanism usable in one or the other of the configurations of transverse abutments, previously described, whether with a shoe 113 (FIG. 22) or with a toothed wheel 116 (FIG. 23). To this end, a trigger 123 articulated directly or indirectly on the casing 104 about a pivot 124 with an axis parallel to the axis of the transverse abutments 113, 116, that is to say perpendicular to the plane of the legs 101, 102 as shown in FIG. 29, drives a roller 125 mounted on a shaft 126 with an axis parallel to the axis of the pivot 124 and positioned between the latter and the control handle 123*a* of the trigger 123. According to this arrangement (FIG. 29), the roller 125 comes to rest only against the notched region 109 of the corresponding leg 101; thus, when the trigger 123 is not actuated by pushing on the handle 123*a,* the roller 125 has no effect on the leg 101 which remains braked against the transverse abutments 113, 116 because of the force F resulting from the load of the pre-compressed clamping band 1.

With reference to FIG. 30, when the user presses the handle of the trigger 123 (arrow G), the roller 125 moves in the same way, in rotation about the axle 124 of the trigger, which pushes back the notched leg 101 toward the other leg 102 such that the notched region 109 of the leg 101 will be offset from the shoe 113 in the first embodiment or the teeth 117 of the toothed wheel 116 in the other embodiment; it will thus be understood that the leg 101 can slide freely forwardly under the force of the load of the pre-compressed clamping band, tending to unload it; as soon as the trigger 123 is released, the blocking position is resumed each time against the shoe 113 or the toothed wheel 116 and so on for stepwise or gradually controlling the deployment of the legs 101, 102, which is to say the operation of releasing the clamping band 1 about a flexible pipe 12.

According to a secondary characteristic of this third modification of the positioning tool, the external edge 109 of the notched leg 101 comprises over all its useful sliding length, which is to say the length of the edge adapted to enter into contact with the transverse abutment 113 or 116, a notched region 109*a* and at least one collateral smooth region, preferably two smooth regions 109*b,* 109*c,* on opposite sides of the notched region on which comes to bear at least one portion of the smooth rolling strip 127 (FIG. 31) of the control roller 125 which can thus roll freely on the smooth zone or zones 109*b,* 109*c* whilst exerting a force R (FIG. 30) tending to push back the leg 101 toward the leg 102, thereby freeing the deployment of the same legs.

According to a preferred embodiment of the invention, the roller 125 is provided on a portion of its peripheral strip, with a ring 128 of flexible and resilient material, for example of elastomer, of an external diameter greater than that of the rolling strip 127 of the roller, thereby providing a shock absorber effect in the first phase of control, when the trigger 123 is actuated, by creating a resilient bearing for said ring 128 on the notched region 109*a* of the corresponding leg 101, rendering more progressive and more flexible its passage from the braked position (FIG. 29) to a free deployed position (FIG. 30).

According to an even more advantageous arrangement, the roller 125 is constituted by two metallic flanges 129 disposed on opposite sides of an elastomeric ring 128 mounted on the same shaft 126, of greater diameter and of a thickness identical to the width of the notched region 109*a* extending over the central region of the external edge 109 of the notched leg 101, nestled to the right and left between two smooth rolling strips 109*b*, 109*c*, which are in line with the smooth rolling strip 127 of each flange 129 of the roller 125, to transmit the force R (FIG. 30) to the leg 101.

According to another secondary characteristic of this modification, the height of the teeth 101*a* of the notched region 109*a* on the external flange 109 of the corresponding leg 101 increases regularly from the head of this leg 101 to its end near the articulation 53 without at the same time changing the general shape of the teeth so as not to modify its ratio with the teeth 117 of the toothed wheel 116 in particular; it has thus been proposed to machine the smooth regions 109*b* and 109*c* of the external edge 109 of the notched leg 101 so as to give them a progressive inflection from the head to the other end near the articulation. In this way, the engagement of the teeth, particularly in the shock absorbing ring 129 of the roller 125 of the swinging mechanism, will be all the greater as the deployment of the legs outwardly is great; thus at this instant the speed of extraction of the legs is greater and this is the reason for which a progressive shock absorber has been sought.

Figure 32:
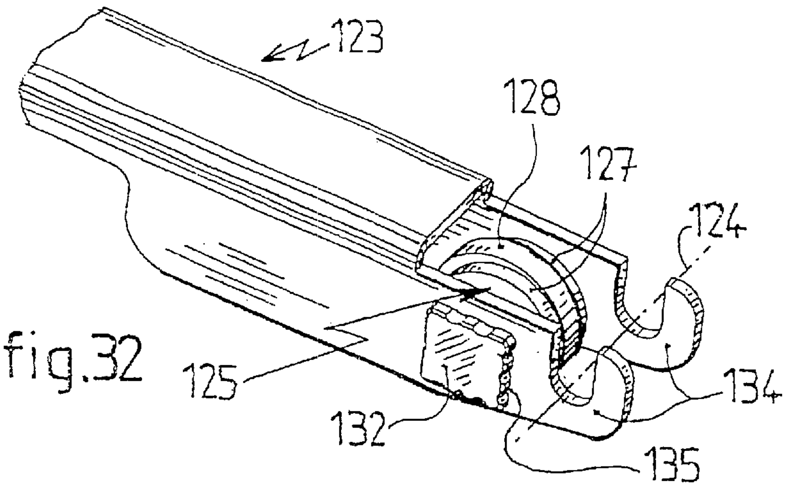
FIG. 32 is a fragmentary perspective view of the end of the hook controlling the adjustment system of the tool of FIGS. 21 to 31, showing the adjustment member of the eccentric roller coacting with the notched leg of the tool.
Figure 33:
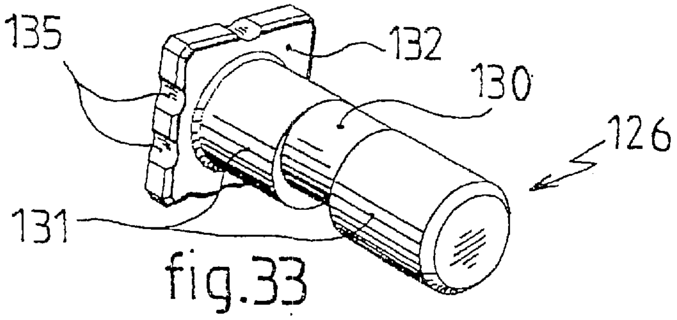
FIG. 33 is a perspective view on a larger scale of the adjustment member of the roller for the adjustment device in the arrangement with a toothed wheel.

Complementarily to the progressive inflection rearwardly of the smooth zones of rolling 109*b* and 109*c* of the external edge 109, it has been provided to mount the two flanges 129 that sandwich the elastomeric ring 128, to form the roller assembly 125, on a shaft 126 whose extent in line with the ring 128 is eccentric as shown in FIG. 33; on opposite sides of the eccentric bearing 130, the bearing 131 designed to receive the two flanges 129 are identical and centered on the axis of the shaft 126. To the extent to which the flanges 129 and the elastomeric ring 128 can turn freely on the shaft 126, it will be understood that by a rotation of the latter about its axis, the flanges 129 are not subject to any radial displacement, whilst the ring 128 moves radially progressively in the plane of the legs as a function of the eccentricity which has been given to the bearing 130. Thus, by successive angular indexing carried out with a simple member 132 (FIGS. 32 and 33) sandwiched in a recess 133 of the casing 104 (FIGS. 21 and 31), there is obtained an offset of the shock absorbing ring 128 relative to the rolling strips 127 of the roller which have not moved, which increases the height of the resilient mass adapted to coact with the teeth 101*a* of the notched region 109 of the leg 101; as is seen in FIG. 32, the roller 125 mounted at the end of the trigger 123 has an eccentric central region corresponding to the ring 128 between two coaxial regions corresponding to the two flanges 129 bearing on the smooth regions 109*b* and 109*c* of the leg 101; it will be understood that to vary the height of the resilient strip of the roller 125, it suffices to carry out a rotation of the member 132 which, as shown in FIG. 32, is constituted by a simple square embedded in a homothetic recess 133 provided for this purpose in a corresponding portion of the casing 104. According to a particular arrangement, the trigger 123 carrying the shaft 126 and the roller 125, is mounted on its axle 124 thanks to two hooks 134 that open upwardly and are encased from below about said axle 124 such that the trigger 123 will be held at its end by the two hooks 134 and bearing by the roller 125 on the edge 109 of the notched leg 101 by the reception of the adjustment member 132 of the eccentric shaft 126 in the recess 133 of the casing 104. It is very simple to modify the adjustment of the eccentricity of the shaft 126 by disengaging the hooks 134 from the axle 124 and pulling outwardly the trigger 123 to remove the member 132 from its recess 133 and to give it a different indexing. As a supplement, there can be provided index marks by marking indicia 135 on the member 132 which remains visible above the tool once the trigger 123 is mounted.

Figures 34, 35, 36:
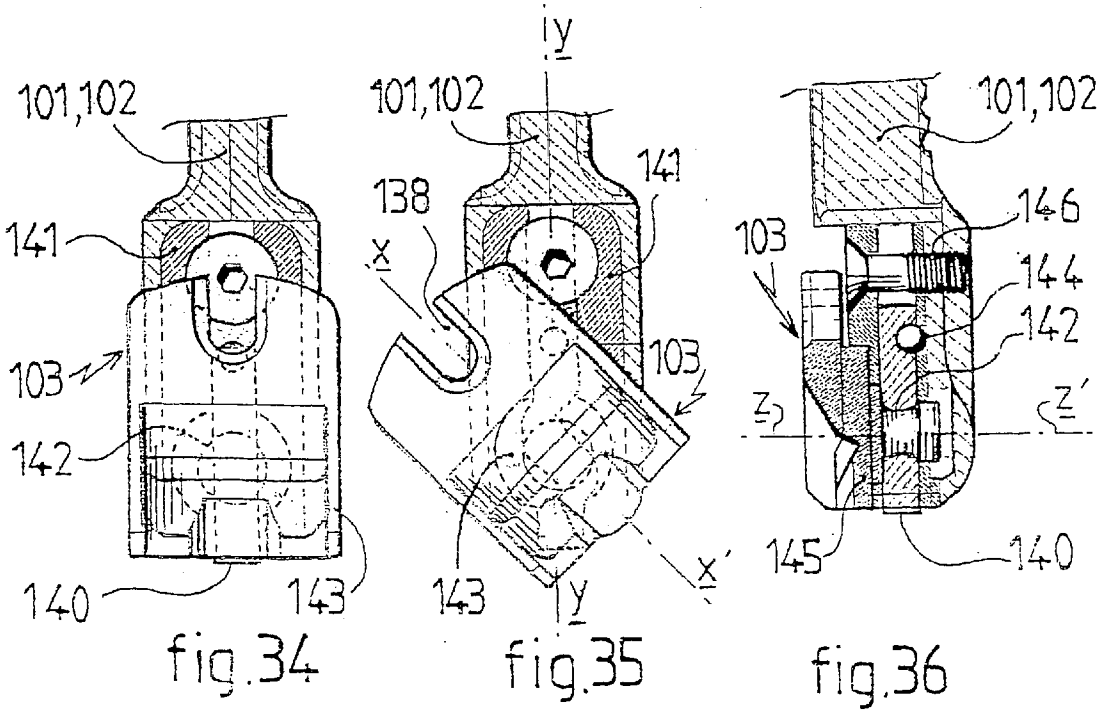
FIGS. 34 and 35 are a schematic view of the rotatable jaws of the heads of the legs of the positioning tool according to the third embodiment, showing respectively according to an isometric front view, the aligned jaw (FIG. 34) and the rightwardly inclined jaw (FIG. 35)
FIG. 36 is an elevational and medial cross-sectional view of the jaw of the head of the notched leg of the tool in its third embodiment.

According to an important characteristic of the invention, with reference to FIGS. 34, 35 and 36, each head of the legs 101 and 102 comprises a rotatable jaw 103 that can be oriented in a plane perpendicular to the plane of the legs about an axis zz' passing through the two heads in the medial plane of the legs, which permits positioning clamping bands 1 in no matter what position, or almost no matter what position, of the tool 100, depending, as has been seen, on the size of the mounting region. Thus, by combining the possibility of rotation of the tool about the clamping band, with the possible inclination provided by the rotation of the jaws 103 as has been mentioned, the tool 100 can be directed in all directions in the space for a same final position of a clamping band 1.

Figure 27:
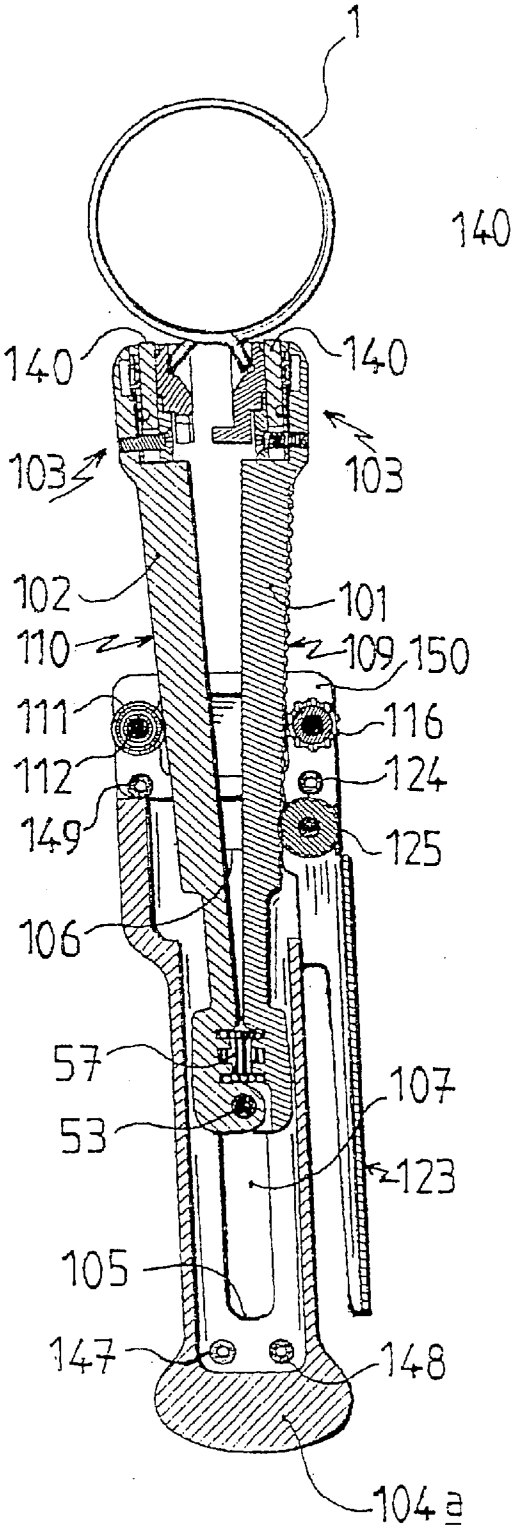
FIG. 27 is an elevational and medial cross-sectional view of the tool carrying a clamping band, as shown in FIGS. 23 and 24, but in the intermediate discharge position.
Figure 28:
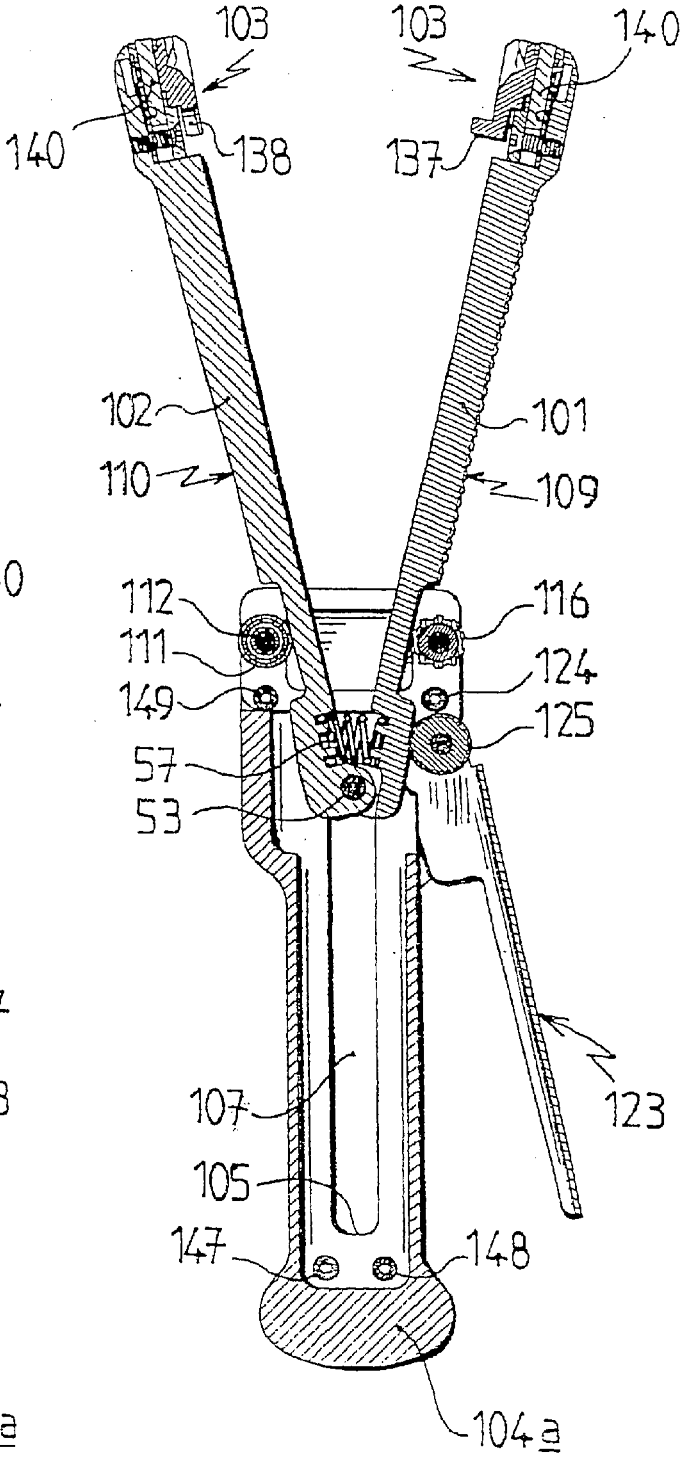
FIG. 28 is a view of the preceding tool in the final position after having discharged and freed the clamping band.

According to a first particular characteristic of the jaws, the jaws 103 of one of the legs 101, comprises a lug 137 which appears in the drawings of the tool in cross-section and particularly in FIGS. 27 and 28, extending perpendicularly toward the jaw of the other leg 102 which is provided with a corresponding recess 138, such that the lug 132 matches exactly the recess 138 when the two jaws 103 are brought together, as shown for example in FIGS. 22 and 23. Thus, when a clamping band 1 is pre-stressed on the positioning tool 100, the legs 100 and 102 are brought together and it is possible to give to the clamping band 1 an inclination that it can vary substantially by more or less than 90° on opposite sides of the medial plane of the tool, so as to find the best position for application of the band. It is evident at this time that the operation of rotation of the pre-compressed clamping band between the jaws of the positioning tool will be made safe: the coaction of the lug 137 with the recess 138 rendering the two jaws 103 secured together during rotation, the clamping band 1 need no longer be freed from the jaws by undesirable twisting of said collar.

According to another particularly advantageous characteristic connected to the jaws 103, the latter are provided with an automatic return mechanism, shown in FIGS. 34 and 35, toward a rest position corresponding to aligned gripping of the clamping bands, as the legs are unloaded. This return mechanism for the jaws 103 from an angular position of their medial axis xx' to the left or right of the medial longitudinal axis of the heads yy', from at most 90° up to the rest position in which the axis xx' coincides with the axis yy', consists in an elastomeric shaft 140 which is preferably cylindrical and held when it is at rest, along the axis yy' of the heads, fixed on one hand and slidable on the other, to the interior of a head 141 secured to the head and passing through the rotative shaft 142 of the jaws when it is in rest position, which is to say when the axis xx' and aligned with the axis yy' of the head; this mounting of the shaft 140 through the shaft 142 of the jaw preferably permits not only holding said jaw on the head of the legs as shown in cross-section in FIG. 36, but also the angular resilient return force resulting from the transverse torsion to the left or right of the elastomeric shaft 140 deformed by the rotation shaft 142, as shown in FIG. 35; a recess 143 in the head 141 of the head and surrounding the rotation shaft 142 is provided to absorb the deformation of the elastomeric shaft 140 when it is twisted.

Supplementally, the mounting of the jaws 103 with automatic return on the heads of the legs is extremely simple: the rotation shaft 142 of the jaws is centered in the head 141 of the head and aligned with the latter so that a resilient shaft 142 can be introduced through a hole extending axially from the distal end of the head to the leg and in such manner that the shaft 140 passes through a radial tunnel traversing the shaft 142 so as to be finally counterblocked by a simple ball 144 disposed before mounting in the head 141; a plate 145 is provided to counterblock the shaft 140 on the ball 144 as well as the assembly of the head by the single means of a screw 146 (FIG. 36).

According to a preferred construction of the tool 100, with reference to FIG. 21, the casing 104 is constituted by two shells 104*a* that are preferably identical, of a plastic material shaped externally to serve as a gripping member for the tool 100; the two shells 104*a* are fixed facing each other by screw 147, 148 and 149 as well as by the axle 124 preferably used for the rotation of the trigger 123, so as to be able to enclose on the one hand the two legs 101 and 102, by being disposed on opposite sides of the plane which said legs form, a longitudinal groove 107 being provided on the internal surface of each shell to receive the ends of the articulation 53 of the legs preferably provided with roller bearings 108 so as to ensure their sliding between the front end 106 and rear end 105 of said grooves 107 serving as abutments, and to enclose on the other hand a metallic cage 150 comprising two flanges 150*a* and 150*b* preferably identical and mounted facing each other, at an equal distance thanks to interposed crosspieces 151 gripped between the screws 147, 148 and 149; this cage 150 thus delimits the opening of the casing 104 traversed by the two legs and supports all the fixed or turning abutments 111, 113, 116 against which come to bear the external edges 110, 109 of the legs as well as the elements forming the swinging mechanism.

Finally, and according to another secondary characteristic of the modification tending to facilitate the sliding of the legs 101 and 102 in the transverse direction relative to the plane that they form in all situations in which the legs are subjected to a left or right lateral force; to limit the friction at the opening of the casing 104 and more particularly against the flanges 150*a*, these latter are recessed to be able to receive a guide member 152 which comes to bear on the lateral surfaces of the legs 101 and 102. The guide member, as shown in FIG. 21, can be a plate 152 made of a material with a low coefficient of friction, for example of silicone, sandwiched between the two lateral flanges 150*a* of the cage 150, slightly overhanging in the direction of the lateral surfaces the legs 101 and 102.

According to another embodiment, the guide member can be constituted by one or several rollers of parallel axes (not shown in the drawings), fixed in the thickness of the lateral flanges of the metallic cage 150 to come to bear against the lateral surfaces of the legs according to a generatrix perpendicular to the direction of their sliding.

The tool 100 as has been described in these different configurations, can be used according to FIGS. 17 to 20 which show in detail the general operation of the positioning tool 50 corresponding to the preceding embodiment, in cooperation with the dispenser 2 to carry out the gripping of a flexible pipe 12 on piping 13 by means of a clamping band 1.

Of course, the improved tool 100 permits increasing the total control of the discharge of the clamping band 1, and this even in a very crowded environment.

What is claimed is:

1. Equipment for positioning a resilient clamping band (1) with two lugs (5) adapted for the repetitive mounting of a flexible pipe (12) on piping (13), comprising:

a manual extraction and positioning tool with jaws, an automatic dispenser (2) storing plural clamping bands (1) and positioning each clamping band (1) such that the two lugs (5) of each clamping band will be accessible from an exterior of the dispenser, the dispenser allowing each clamping band to be gripped by the jaws (9, 52, 103) of the manual extraction and positioning tool (8, 50, 100), the tool having an approach to compress the lugs (5) of the clamping band (1) obtained by external actuating means (11) that are separately controlled, the tool (8, 50, 100) comprising means to permit the free and non-reversible approach of the jaws (9, 52, 103) toward each other when the external actuating means (11) are actuated, and means to release the jaws directly or progressively, at a desired time, by an external control (14, 123), wherein, repetitive mounting of flexible pipes (12) on piping (13) the from dispenser (2) of the clamping bands (1) by the tool (8) may be accomplished by the successive steps of:

a) emplacing the jaws (9) of the tool on the lugs (5) of a first clamping band (1) presented by the dispenser (2), b) pre-locking the jaws (9) of the tool against the lugs (5) of said first clamping band (1) to bring the first clamping band into an open position thanks to the external actuating means (11), c) automatically holding the jaws in the pre-locking position, d) withdrawing from the dispenser (2) the first clamping band held open by the hand tool (8), a second clamping band (1) being automatically placed in position for a further extraction by the dispenser, e) positioning the open first clamping band (1) about the flexible pipe (12), f) releasing the locking of the jaws (9) of the tool (8), which is provided for this purpose with the external control (14) to close the clamping band (1) on the flexible pipe (12) to cause the first clamping band to lock on the piping (13), and g) disengaging the tool (8) for a new operation.

2. Equipment according to claim 1 characterized in that the dispenser (2) comprises:

at least one column (3) for stacking on edge a series of the resilient clamping bands (1) of a selected size, a housing (7) mounted under the column, an opening at a lower end (6) in the housing (7), the opening being of a height slightly greater than the width of a single clamping band (1), the column (3) having a lateral cutout (4) adapted to disengage while guiding the lugs (5) of each clamping band (11) when each clamping band descends by gravity in the column (3) toward the housing (7) in a position to facilitate insertion of the lugs between the jaws (9, 52, 103) of the tool (8, 50, 100).

3. Equipment according to claim 2 characterized in that the housing (7) of the dispenser (2) is provided, on opposite sides of the lugs (5) of the clamping band (1) positioned awaiting withdrawal and facing the lugs, with two movable compression shoes (11) that can move toward each other and back by mechanical drive means, to compress the jaws (9, 52, 103) of the tool (8, 50, 100) as soon as the jaws are positioned about the lugs (5).

4. Equipment according to claim 2 characterized in that the housing (7) of the dispenser (2) is shaped and made of a material to resist untimely ejection of the clamping band at a time of opening the clamping band and to resist flying pieces of the clamping band at a time of the clamping band breaking.

5. Equipment according to claim 1 characterized in that the manual extraction and positioning tool (8) comprises:

a body (21) having a head (20) connected to a sleeve (22) for gripping by a tool user, the head and sleeve stacked along a longitudinal axis XX', the sleeve including a shaft (21), two legs (10) articulated about an articulation axle (23) and secured to the head, a control (14) provided exterior to and penetrating into the sleeve to automatically space apart the jaws (9), the two jaws (9) facing each other, the jaws shaped to receive the lugs (5) of the resilient clamping band (1), the jaws disposed at first ends of two legs (10) on a first side of the articulation axle, the legs having a length 'a' measured from the axle (23) to the head (20) of the tool (8), a second end of each leg located at a distance 'b' on a second side of the articulation axle (23), with a ratio R=a/b dependent on the size of the clamping bands and of a general geometry of the tool, a pair of rods (24) with first rod ends and second rod ends, each of the rods (24) connected at the first rod end to the second end of one of the legs, each of the rods connected at the second rod end to a common axle (25), the rods being articulated each at the second end connected to the common axle (25), the common axle is secured to an internal shaft (27) within a rod head (26) which causes a linear displacement of the common axle, along the longitudinal axis XX' of the tool, the internal shaft (27) includes a resilient abutment (31) contact with a member (32) tending to press the internal shaft longitudinally toward the articulation axle (23) of the tool (8) and hence to space the jaws by articulations of the rods and the legs, a blocking system, with controlled reversibility, associated with the internal shaft (27) to permit freely and automatically linear movement of the internal shaft when the jaws approach each other and the internal shaft compresses the resilient member (32), the blocking system preventing reverse movement of the internal shaft, except upon actuation of the control (14) provided to automatically space apart the jaws (9).

6. Equipment according to claim 5 characterized in that the blocking system is obtained by the coaction between the shaft and a conical wedge, the shaft having, along a shaft axis, a conicity section enlarging from the rod head (26) to the resilient abutment (31) and providing a conical portion, the conical wedge (35) having an axis perpendicular to the shaft axis and being able to move axially downwardly upon an action of the control (14) and upwardly upon the reaction of a resilient member (36), the conical wedge being disposed in a well (37) to be constantly in frictional engagement with the conical portion of the shaft (27) such that, a smallest cross-section of the conical wedge being uppermost on a side opposite the resilient member pressing the wedge, the conical wedge does not constitute a blocking brake when the shaft (27) moves toward the resilient member (32) and, on the contrary, produces friction sufficient to prevent the reverse movement of the shaft (27) urged both by a gripping force of the clamping band (1) and a return force of the resilient member (32).

7. Equipment according to claim 6 characterized in that, the conicity of the shaft (27) results from a flat (40) along a generatrice of the shaft at least over an effective length corresponding to an axial movement of the shaft during maximum clearance of the free jaws (9), with a machined slope in a radial direction providing a progressive ramp adapted to coact with the conical wedge (35), the slope of the ramp being sufficient to obtain relative sliding with the conical wedge (35) in one direction and a blockage in the other direction as a function of mechanical characteristics of the tool (8) and the clamping bands (1).

8. Equipment according to claim 6 characterized in that, the tool further comprises an internal wall within the body (21), a return spring (36) bearing on the internal wall of the body, wherein, the wedge (35) is a cylindrical wedge with plural bicycle wedge cut surfaces having an upper end of smallest cross-section opposite the return spring (36) bearing on the internal wall of the body (21) of the tool, and opens freely to the outside of the body to be accessible by downwardly pressure of the user to disengage the tool (8) from the positioned clamping band (1), and a control trigger (14) being operatively connected to the wedge to lessen the force necessary to push back said wedge 35).

9. Equipment according to claim 5 characterized in that the head (20) of the withdrawal tool (8) comprises means to pivot totally on itself about the longitudinal axis xx' of the tool permitting pivoting in a space of a plane containing the two legs (10) supporting the jaws (9).

10. Equipment according to claim 9 characterized in that the rod head (26) for articulation of the rods (24) is secured in translation to the end of the shaft (27) by an assembly ensuring, between the rod head and said shaft, a freedom of rotation in a plane perpendicular to the axis of the shaft (27).

11. Equipment according to claim 5 characterized in that the legs (10) supporting the jaws (9) are inclinable from zero to 90° relative to a plane that the legs define when the legs are straight.

12. Equipment according to claim 5 characterized in that, a pressure on the shaft (27) for release of the jaws (9) is adjustable by an axial movement of the abutment (31) mounted at the end of the shaft (27), and the resilient member is a helicoidal spring (32) bearing on an internal end of the handle (22) and on a cup (43) positionable by a screw-threaded nut (44) coacting with the end of the shaft (27).

13. Equipment according to claim 1 characterized in that the extraction and positioning tool (50, 100) further comprises:

a casing with an opening, a stop abutment (56) proximate the opening, and a bottom, two legs (51, 101–102) with slidably articulated ends, the casing covering the articulated ends, the legs provided, at first ends, with jaws (52, 103) and, at second ends, with an articulation (53) to open freely under the action of a load of the clamping band (1) from a closed position in which the jaws (52, 103) maintain compression of the clamping band (1) to a deployed position of a V shape permitting the jaws to engage or disengage with the lugs (5) of the clamping band (1) when the clamping band is respectively presented by the dispenser (2) or discharged after emplacement on the flexible pipe (12), the legs coacting with means such that the legs are mounted slidably by their articulated ends along a longitudinal axis to an interior of the casing and in abutment (67, 105) with the bottom of the casing (54, 104), the jaws (52, 103) emerging from the opening of said casing, and a brake means stabilizing the legs as the legs are progressively slid outward under a controlled action of a load of the clamping band (1) to the stop abutment (56, 106), and a resilient member (57) pushing them apart the legs into a V shape when extended to the stop abutment.

14. Equipment according to claim 13 characterized in that, the legs (51) each have along an external edge (59) at least one series of three facets (60, 61, 62) perpendicular to the plane of the legs (51) and connecting according to a convex profile, a first facet (60) extending from a securement of the jaw (52) to flare outwardly over a distance corresponding to an emergent portion when the legs (51) are in abutment (67) within the casing (54), a second facet (61) connected to the first facet at an angle bringing the first facet into a position parallel to or slightly reentrant relative to a plane of symmetry of the V of the legs (51) over a distance ‘a’, and a third facet (62), connected to the second facet and inclined inwardly with a gentle slope in the direction of the articulation axle (53);

the casing includes an enlarged portion (58) at the opening (55) with internal side walls, and shoes (63) of a maximum width ‘a’ are mounted on a pivot (64) on opposite sides of the internal side walls of the enlarged portion (58) of the opening (55) of the casing (54) to coact with the second and third facets (61, 62) of the legs, respectively to create a sufficient braking of the legs (51) when the legs are in abutment (67) within the casing (54) and urged by the load of the clamping band which tends thus to press the legs back toward an exterior of the casing, and to facilitate the withdrawal of the legs (51) outside the casing (54) at a time of positioning the clamping band (1) on the flexible pipe (12) by balancing and rendering progressive deployment of the legs.

15. Equipment according to claim 14 characterized in that there is provided a groove (65) on a lower portion of the third facet (62) of each leg (51) of the tool permitting each shoe (63) to be received within the leg (51) corresponding to the articulation axle (53) of the deployed legs arriving at the stop abutment (56) and creating an abrupt increase of an opening between the legs to permit the disengagement of the jaws (52) of the clamping band (1) and to constitute a fugitive ready position for the legs (51).

16. Equipment according to claim 13 characterized in that an external portion of the legs (51) supporting the jaws (52) is inclinable from zero to 90°.

17. Equipment according to claim 13 characterized in that, the two legs comprise longitudinal sliding means within the casing (104), the sliding means provided with elements for sliding of the articulation axle between two opposite grooves (107) hollowed into the internal wall of the casing (104), ball bearings (108) being provided on ends of said articulation axle on opposite sides of the legs (101, 102) to coact with said grooves (107) and two transverse abutments positioned transversely at the opening of the casing on opposite sides of the legs (101, 102), the legs having external edges (109, 110), one edge being a smooth track and another edge being at least partially notched, the edges providing the legs under load of a compressed clamping band (1) a guidance, free and sliding, on one leg (102) and a free or braking guidance on the other leg (101), by a bias of a mechanism of control regulation such that an assembly of the two legs starting from an internal position in rear abutment (105) at one end of the grooves (107) in which the clamping band (1) is totally compressed, deploy progressively by gradual and controlled action on said regulation mechanism until the articulation axle (53) arrives into a front abutment (106) at the other end of the grooves (107), on the side of the opening located a good distance in front of the transverse abutments (111, 113, 116) to limit the angle of opening of the legs to a value sufficient to permit disengagement of the lugs (5) of the clamping band (1).

18. Equipment according to claim 17 characterized in that the regulation mechanism of the tool (100) is comprised by:

a transverse fixed abutment (113) or pivoting abutment (116) coming into abutment against a notch located on the external edge (109) of one leg (101), to constitute a friction zone adapted to be opposed to the deployment of the legs (101, 102) under the action of the load of the clamping band (1), a roller (125) freely turning about a shaft (126) perpendicular to the plane of the legs, the roller can be brought from an outside position into contact with the edge (109) of the notched leg (101), by an external trigger (123), permitting pressing back said leg or avoiding the contact between teeth **(101*a*) of the leg (101) and the corresponding transverse abutment (113, 116)**.

19. Equipment according to claim 18, characterized in that the external edge (109) of the notched leg (101) comprises, over all its length usable for sliding in contact with the transverse abutment (113, 116), a notched region **(109*a*) and at least one smooth collateral region (109*b*, 109*c*) located to bear at least one smooth rolling strip (127) of a control roller (125) to roll freely whilst bearing on the leg (101)**.

20. Equipment according to claim 19 characterized in that the roller (125) comprises a peripheral strip (127) and is provided over a portion of the peripheral strip (127) with a ring of flexible resilient material of an external diameter greater than a diameter of the rolling strip (127) of the roller, the resilient material providing a shock absorbing effect in the first phase of control by resiliently bearing against the notched region **(109*a*)** of the corresponding leg, which renders progressive and flexible passage of the leg from a braked position to a freely deployed position.

21. Equipment according to claim 20 characterized in that the roller (125) is constituted of two identical metallic flanges (129) disposed on opposite sides of an elastomeric ring (128), the metallic flanges each having a smooth rolling strip (127), the flanges and elastomeric ring being mounted on a common shaft (126), the elastomeric ring of greater diameter and of a thickness identical to the width of the notched region (109*a*), the elastomeric ring extending over a central region of the external edge (109) of the notched leg (101), the elastomeric ring being enclosed to the left and right by two smooth rolling strips (109*b*, 109*c*) in line with the smooth rolling strip (127) of each flange (129) of the roller (125).

22. Equipment according to claim 21 characterized in that, the two flanges (129) sandwich the elastomeric ring (128) and turn freely on the common shaft (126), the common shaft having an eccentric bearing (130) with the elastomeric ring (128), an indexing mechanism for an angular position of said shaft permitting variation of a useful height of a resilient mass coming into contact with the notched region (109*a*) of the corresponding leg (101), the flanges of the shaft (126) being not subject in consequence to any radial displacement during angular indexing of said shaft (126).

23. Equipment according to claim 18 characterized in that the transverse abutment of the regulation mechanism is fixed and is a shoe (113) of elastomer secured to the casing (104) and coacting with the teeth (101*a*) of the notched leg (101) by simple compression resulting from the load of the clamping band (1).

24. Equipment according to claim 18 characterized in that the transverse abutment of the regulation mechanism is a turning abutment constituted by a toothed wheel (116), in engagement in a contact zone with the notches (101*b*) of the external edge (109) of the notched leg (101), the turning abutment having a coaxial bore (118) and teeth (117*a*) with a pitch equal to a pitch of the teeth (101*a*) of the leg (101), and a fixed support shaft (119) about which the toothed wheel (116) is mounted for rotation, this fixed support shaft (119) having an external diameter less than the internal diameter of the bore of the wheel (116) such that, because of the radial play thus provided, the wheel (116) can move radially between a substantially centered unblocking position in which the summits of the teeth (101*a*) of the notched leg (101) which are nearest the wheel (116), are located outside the pitch circle P of the teeth (117*a*) of the wheel (116) and the notched leg (101) can thus move freely, and an eccentric blocking position, when the notched leg (101) exerts on the wheel (116) a force F resulting from the load of pre-compressed clamping band (1), which force is directed toward the axis $O_1$ of the fixed support shaft (119), in which position the summit of a tooth (101*a*) of the notched leg (101) is located between two teeth (117*a*) of the toothed wheel (116), within the pitch circle P, such that the notched leg (101) and the wheel (116) are mutually blocked, thereby causing the immediate stopping of the deployment of the legs (101, 102) except to actuate the swinging mechanism to press back the notched leg (101) to a position in which the summits of its teeth (101*a*) are located outside the pitch circle P, the teeth (117*a*) of the toothed wheel (116) thus being no longer blocked in the notches (101*b*) of the notched leg (101).

25. Equipment according to claim 24 characterized in that, between the toothed portion of the toothed wheel (116) and the support shaft (119), there is interposed a ring (121) of resilient material ensuring by compression of the notched leg (101) resulting from the load of the clamping band (1), the centering to give rise to stopping the sliding of said leg, and conversely the recentering of the teeth (117) on the shaft (119), as soon as the swinging mechanism is actuated.

26. Equipment according to claim 25 characterized in that a toothed crown (117) of the toothed wheel (116) is associated with two lateral flanges (122) that are bored and form together a recess adapted to receive by boring the resilient ring (121), mounted on the support shaft (119) fixed to the casing (104), the diameter of the bore of the flanges (122) being computed, at the minimum, to obtain a sufficient displacement to create the blocking effect and, at the maximum, to limit the compression of the ring (121) to avoid deterioration during a heavy load provided by largest clamping bands.

27. Equipment according to claim 20 characterized in that a height of the teeth (101*a*) of the notched region (101*a*) on the external edge (109) of the corresponding leg (101) increases regularly from a head of the leg (101) to an end near the articulation (53) by progressive inflection of the smooth rolling zone or zones (109*b*, 109*c*) of the external edge (109) of the notched leg (101).

28. Equipment according to claim 27 characterized in that each head of the legs (101, 102) comprises a jaw (103) rotatable about an axis zz' passing through two heads in the medial plane of the legs.

29. Equipment according to claim 28 characterized in that the jaw (103) of one leg (101) comprises a lug (137) extending perpendicularly toward the jaw of the other leg (102), the jaw of the other leg being provided with a corresponding recess (138) such that the lug (137) matches the recess (138) when the two jaws (103) are brought together.

30. Equipment according to claim 29 characterized in that the jaws (103) are provided with an automatic return mechanism toward a rest position corresponding to an aligned engagement of the clamping bands (1), when the legs are discharged.

31. Equipment according to claim 30 characterized in that the automatic return mechanism of each jaw (103) from an angular position to the left or the right of at most 90° to a rest position, consists of a resilient shaft (140) maintained at rest along the axis yy' of the head of the leg fixed on the one hand and slidable on the other hand within a head (141) secured to the head and passing through the rotation shaft (142) of the jaw in rest position, aligned with the head, thereby providing both the holding of said jaw and the angular return effect resulting from the transverse torsion to the left or the right.

32. Equipment according to claim 17 characterized in that the casing (104) of the tool is constituted by two shells (104*a*) identical to each other of plastic material shaped externally to serve as a gripping member for the tool (100), fixed facing each other to enclose on the one hand the two legs (101, 102) on opposite sides of the plane that they form, a longitudinal groove (107) on the internal surface of each shell being provided to receive the ends of the articulation axle (53) provided with ball bearings (108) to ensure sliding between the front ends (106) and rear ends (105) of the grooves (107) serving as abutments and, on the other hand, a metallic cage (150), delimiting the opening of the casing

(104) traversed by the two legs, which support the abutments (111, 113, 116) against which bear the external edges (110, 109) of said legs and the swinging mechanism.

33. Equipment according to claim 17 characterized in that a guide member (152), bearing on lateral surfaces of the legs, is disposed in the opening of the casing (104) to limit transverse friction in the sliding of the legs (101 and 102).

34. Equipment according to claim 33 characterized in that the guide member is a plate (152) of a material of low coefficient of friction, enclosed between the two lateral flanges **(150*a*) of the metallic cage (150)** slightly overhanging the lateral surfaces of the legs.

35. Equipment according to claim 34 characterized in that the guide member is constituted by one or several rollers with parallel axes, fixed between the lateral flanges of the metallic cage (150) to come to bear against the lateral surfaces of the legs along a generatrix perpendicular to the direction of sliding.

* * * * *